(12) United States Patent
Hashimoto

(10) Patent No.: US 6,375,575 B2
(45) Date of Patent: Apr. 23, 2002

(54) DAMPER MECHANISM

(75) Inventor: Yasuyuki Hashimoto, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/818,674

(22) Filed: Mar. 28, 2001

Related U.S. Application Data

(62) Division of application No. 09/350,187, filed on Jul. 9, 1999.

(30) Foreign Application Priority Data

Jul. 17, 1998 (JP) .......................... 10-204062
Jul. 17, 1998 (JP) .......................... 10-204063

(51) Int. Cl.[7] .............................. F16D 3/66; F16D 3/14
(52) U.S. Cl. .................................... 464/68; 192/213.22
(58) Field of Search .................. 74/574; 464/68, 464/66; 192/213.22, 214.1, 204, 70.17

(56) References Cited

U.S. PATENT DOCUMENTS

| | | | | |
|---|---|---|---|---|
| 5,725,080 A | * | 3/1998 | Lohaus | 192/70.17 |
| 5,771,999 A | * | 6/1998 | Kleifges et al. | 192/213.12 |
| 5,829,567 A | * | 11/1998 | Ament | 192/70.17 |
| 5,975,272 A | * | 11/1999 | Lefevre | 192/213.12 |
| 5,984,073 A | * | 11/1999 | Lohaus et al. | 192/213.2 |
| 6,016,899 A | * | 1/2000 | Ament | 192/204 |
| 6,026,710 A | * | 2/2000 | Orlamunder et al. | 464/66 |
| 6,089,983 A | * | 7/2000 | Lebas et al. | 464/68 |
| 6,110,046 A | * | 8/2000 | Rohs et al. | 464/66 |
| 6,186,897 B1 | * | 2/2001 | Graton et al. | 464/63 |
| 6,270,417 B1 | * | 8/2001 | Hashimoto | 464/68 |

\* cited by examiner

*Primary Examiner*—Lynne H. Browne
*Assistant Examiner*—Kenn Thompson
(74) *Attorney, Agent, or Firm*—Shinjyu Global IP Counselors, LLP

(57) ABSTRACT

A clutch disk assembly (1) includes an input rotary member (2), an output rotary member (3), a damper mechanism (4, 5) and a large friction mechanism (13). The damper mechanism couples the input and output rotary members (2) and (3) together in a rotating direction. The damper mechanism exhibits torsion characteristics having differing first stage and second stage responses such that in the second stage a higher degree of rigidity is exhibited than in the first stage. In the second stage when small levels of vibrations are dampened, the response characteristics in response to positive direction rotary displacement between the input and output rotary members differs from the response characteristics exhibited as a result of negative direction relative rotary displacement. Specifically, in the positive direction, the large friction mechanism (13) is prevented from operating in a first angular range within the second stage. In the negative direction, the large friction mechanism (13) is prevented from operating in a second angular range in the second stage. The first and second angular ranges differ.

10 Claims, 34 Drawing Sheets

DAMPER MECHANISM

CROSS REFERENCE TO RELATED APPLICATION

This application is a divisional application of copending U.S. patent application No. 09/350,187, filed Jul. 9, 1999.

BACKGROUND OF THE INVENTION

A. Field of the Invention

The invention relates to a damper mechanism, particularly a damper mechanism for damping torsional vibrations in a power transmission system.

B. Description of the Background Art

A clutch disk assembly used in, for instance an automotive vehicle, is typically installed in a clutch mechanism such that the clutch disk assembly may be used in clutch engagement and clutch disengagement operations for transmitting torque from a flywheel to a transmission input shaft. The clutch disk assembly preferably also includes a vibration dampening function for absorbing and damping vibration transmitted from the flywheel. Generally, vibrations of a vehicle include idling noises (rattle), driving noises (acceleration/deceleration rattle and muffled noises) and tip-in/tip-out (low frequency vibrations). The clutch disk assembly has the above damper function for removing these noises and vibrations.

The idling noises are rattling noises which occur from a transmission when the transmission is in a neutral position, e.g., during waiting at traffic signals with clutch pedal off. This rattling occurs due to the fact that an engine torque is low in an engine idling range and engine combustion causes large torque variations in the idling range. In this state, gear contact occurs between an input gear and a counter gear of a transmission, and thereby noises are produced.

The tip-in/tip-out low frequency vibrations are large longitudinal vibrations of a vehicle which occur when a driver rapidly depresses or releases an accelerator with the clutch in an engaged, torque transmitting condition. If rigidity of a drive transmission system is low, torque transmitted to wheels is transmitted or reflected from the wheels back through the drive train creating large oscillations of torque.

In a state where no torque is transmitted (zero torque transmission), for instance during idling, the dampening characteristics of most clutch disk assemblies is such that idling vibrations cannot be adequately dampened creating corresponding noises, therefore, a low torsional rigidity is preferable in this region of zero torque transmission. Contrarily, it is necessary to maximize the rigidity of the torsion characteristics of the clutch disk assembly for suppressing the longitudinal vibrations of the tip-in/tip-out.

For overcoming the above problems, a clutch disk assembly which uses two kinds of springs for achieving vibration dampening characteristics in two separate stages has been developed. The structure of this clutch disk assembly includes three rotary members adapted to undergo relative rotary displacement with respect to one another. A first spring having a low rigidity elastically couples first and second rotary members. A second spring having more rigid or stiff characteristic elastically couples a third rotary member and the second rotary member. The clutch disk assembly is configured to have a low torsional rigidity and a low hysteresis torque in the first stage where the first spring is compressed. Vibrations exhibiting small angular displacement having a low torsion angle are dampened and therefore the clutch disk assembly can achieve an effect of preventing noises during idling. Since the torsional rigidity and the hysteresis torque are high in the second stage of a high torsion angle due to the stiffness of the second spring, the longitudinal vibrations at the time of tip-in/tip-out can be effectively damped.

Such a damper mechanism is already known where operation of a high hysteresis torque generating mechanism (friction generating mechanism) in the second stage is at least partially prevented when minute vibrations occur thereby allowing dampening of minute vibrations by a low hysteresis torque.

The angular displacement within the second stage of operation in which a large friction mechanism does not operate is very small and, e.g., about 2 degrees. This region of the second stage can be provided in the positive second stage, in which the input rotary member rotates or twists in the torque transmission direction (positive rotational direction) relatively to the output rotary member, and the negative second stage, in which the relative rotation occurs in the opposite direction (negative rotational direction). In the prior art, the same structure is used for limiting the operation of the large friction mechanism in both the positive and negative portions of second stages. Therefore, the torsion characteristics in positive and negative rotation directions, in which a high hysteresis torque does not occur in response to minute vibrations, have equal circumferential angles with respect to one another.

However, the angular displacement in the positive rotation direction within the second stage of operation which exhibits low hysteresis torque must be sufficiently large to prevent generation of high hysteresis torque in response to engine torque vibrations during normal driving. However, if in the positive rotation direction the low hysteresis torque is large, the negative direction characteristics of low hysteresis torque may be excessively large. Specifically, if the angular displacement in the negative rotation direction for generation of low hysteresis torque is large, it is may be impossible to generate high hysteresis torque on the opposite sides of the resonance frequency during deceleration, resulting in a large vibration peak.

SUMMARY OF THE INVENTION

An object of the invention is to provide a damper mechanism which overcomes the problems associated with a damper mechanism in which there is no difference between regions in positive and negative second stages where low a hysteresis torque is generated in response to minute torsional vibrations.

In accordance with one aspect of the present invention, a damper mechanism includes a first rotary member and a second rotary member coupled to the first rotary member for limited relative rotary displacement therebetween such that torque is transmittable therebetween. A damper mechanism is disposed between the first and second rotary members coupling the first and second rotary members together in a rotating direction. The damper mechanism is adapted to exhibit torsion characteristics in first and second stages of relative rotary displacement between the first and second rotary members. Displacement in the second stage causes the damper mechanism to exhibit a higher rigidity than displacement in the first stage. The damper mechanism is adapted to provide dampening in the first and second stages in response to displacement in both positive and negative rotation directions, positive rotation corresponding to rotation of the second rotary member in a rotational driving direction with respect to the first rotary member,, and the negative rotation corresponding to rotation of the second rotary member in a rotational direction opposite the rotational driving direction with respect to the first rotary member. A friction mechanism is adapted to generate friction in response to relative rotary displacement between the first and second rotary members in the second stage. A friction suppressing mechanism is adapted to operate in response to torsional vibrations that do not exceed a predetermined level in the second stage. The friction suppressing mechanism is adapted to stop operation of the friction mechanism in response to torsional vibration within a first angular range in the direction of positive rotation within the second stage, and the friction suppressing mechanism is further adapted to stop operation of the friction mechanism in response to torsional vibration within a second angular range in the direction of negative rotation within the second stage. The first angular range and the second angular range are different in magnitude.

In accordance with another aspect of the present invention, a damper mechanism includes a first rotary member and a second rotary member coupled to the first rotary member for limited relative rotary displacement therebetween such that torque is transmittable therebetween. A damper mechanism is disposed between the first and second rotary members coupling the first and second rotary members together in a rotating direction and adapted to exhibit torsion characteristics in first and second stages of relative rotary displacement between the first and second rotary members. Displacement in the second stage causes the damper mechanism to exhibit a higher rigidity than displacement in the first stage. The damper mechanism is adapted to provide dampening in the first and second stages in response to displacement in both positive and negative rotation directions. Positive rotation corresponds to rotation of the second rotary member in a rotational driving direction with respect to the first rotary member, and the negative rotation corresponds to rotation of the second rotary member in a rotational direction opposite the rotational driving direction with respect to the first rotary member. A friction mechanism is adapted to generate friction in response to relative rotary displacement between the first and second rotary members in the second stage. A first friction suppressing mechanism is adapted to operate in response to torsional vibrations that do not exceed a predetermined level in a first angular range within the second stage in the direction of positive rotation. The first friction suppressing mechanism is adapted to stop operation of the friction mechanism in response to torsional vibration within the first angular range in the direction of positive rotation within the second stage. A second friction suppressing mechanism is adapted to operate in response to torsional vibrations that do not exceed a predetermined level in a second angular range within the second stage in the direction of negative rotation. The second friction suppressing mechanism is adapted to stop operation of the friction mechanism in response to torsional vibration within the second angular range in the direction of negative rotation within the second stage.

Preferably, the second angular range has a different angular magnitude than the first angular range.

Preferably, the second angular range is smaller than the first angular range.

Preferably, the angular magnitude of the second angular range is approximately half of that of the first angular range.

In accordance with another aspect of the present invention, a damper mechanism includes a first rotary member (3) and a second rotary member (2) coupled to the first rotary member for limited relative rotary displacement therebetween, the second rotary member adapted to transmit torque to the first rotary member. A first intermediate plate (6) is disposed operably between the first and second rotary members. A first elastic member (7) elastically couples the first rotary member to the first intermediate member in a rotating direction. The first elastic member is compressible therebetween and defines a first stage of relative rotary displacement between the first and second rotary members. A second elastic member (8) elastically couples the first intermediate member to the second rotary member in the rotating direction. The second elastic member is more rigid than the first elastic member and the second elastic member is compressible therebetween defining a second stage of relative rotary displacement between the first and second rotary members. A second intermediate member (11) is frictionally engaged with the second rotary member such that the second intermediate member is slidable in the rotating direction relative to the second rotary member. A portion of the second intermediate member being adapted for contact with the second elastic member but is spaced apart from the second elastic member with the damper mechanism in a torsion free state. In positive and negative directions of rotary displacement occur within the second stage of relative rotary displacement between the first and second rotary members, the positive direction being a direction the second rotary member is displaced with respect to the first rotary member in a rotational driving direction, and the negative direction being a direction the second rotary member is displaced with respect to the first rotary member in a direction opposite the rotational driving direction. A first circumferential space (ACp) is defined between the portion of the second intermediate member and a first portion of the second elastic member with the damper mechanism in a torsion free state thereby preventing the second intermediate member from sliding on the second rotary member in response to compression of the second elastic member in the positive direction. A second circumferential space (ACn) is defined between the portion of the second intermediate member and a second portion of the second elastic member with the damper mechanism in a torsion free state thereby preventing the second intermediate member from sliding on the second rotary member in response to compression of the second elastic member in the negative direction. The first and second circumferential spaces are formed independently from each other.

Preferably, the second intermediate member is disposed between the first rotary member and the first intermediate member, and the first and second circumferential spaces are formed between the first and second intermediate members.

In accordance with still another aspect of the present invention, a damper mechanism includes an output hub (3) and a pair of input plates (21, 22) rotatably disposed about the output hub. A first intermediate member (6) is rotatably disposed radially outward from the output hub, the first intermediate member further being disposed axially between the pair of input plates. A first elastic member (7) elastically couples the output hub to the first intermediate member limiting relative rotary displacement therebetween. Compression and expansion of the first elastic member define a first stage of relative rotary displacement between the input and output plates. A second elastic member (8) elastically couples the first intermediate member to the pair of input plates limiting relative rotary displacement therebetween. The second elastic member is more rigid than the first elastic member. Compression and expansion of the second elastic member defines a second stage of relative rotary displacement between the input and output plates. A second intermediate member (11) is disposed axially between the output hub and the pair of input plates. The second intermediate member is adapted for frictional engagement with at least one of the pair of input plates such that the second intermediate member generates friction in response to relative rotary displacement with the one of the pair of input plates. Relative rotary displacement between the input plates and the output hub occurs in both positive and negative directions. In the positive direction the input plates rotate relative to the output hub in a rotational driving direction, and in the negative direction the input plates rotate relative to the output hub in a direction opposite the rotational driving direction. A first circumferential space (ACp) is defined between the portion of the second intermediate member and a first portion of the second elastic member with the damper mechanism in a torsion free state thereby preventing the second intermediate member from sliding on the one of the input plates in response to compression of the second elastic member in the positive direction. A second circumferential space (ACn) is defined between the portion of the second intermediate member and a second portion of the second elastic member with the damper mechanism in a torsion free state thereby preventing the second intermediate member from sliding on the one of the input plates in response to compression of the second elastic member in the negative direction. The first and second circumferential spaces are formed independently from each other.

Preferably, the second intermediate member includes a pair of plate members (11) arranged on axially opposite sides of the first intermediate member, and a coupling member (62) connects the pair of plate members such that the pair of plate members rotate together. The first intermediate member is formed with at least one aperture (69), the coupling member extending through the aperture. The first and second circumferential spaces are defined between the aperture and the coupling member.

Preferably, a first stop mechanism (9) is defined between the pair of input plates and the output hub, the first stop mechanism defining a range of relative rotary displacement between the pair of input plates and the output hub within a first space angle. A second stop mechanism (12) is defined between portions of the pair of input plates and the second intermediate member, the second stop mechanism allowing relative rotary displacement between the pair of input plates and the second intermediate member only within a second space angle. A third stop mechanism (14) is defined between portions of the second intermediate member and the first intermediate member, the third stop mechanism allowing relative rotary displacement only within a third space angle formed between the second intermediate member and the first intermediate member. The first and second circumferential spaces are each an angular range of displacement that is equal to the third space angle minus the difference between the first space angle and the second space angle.

Preferably, the first and second circumferential spaces are defined by different circumferential angles.

Preferably, the second circumferential space is smaller than the first circumferential space.

Preferably, the second circumferential space is approximately half of the first circumferential space with respect to size.

According to the damper mechanism described above aspect, the first and second friction suppressing mechanisms are independent of each other. Therefore, the first angular range defined by the first friction suppressing mechanism can be different from the second angular range defined by the second friction suppressing mechanism without difficulty. Accordingly, each of the first and second angular ranges can be appropriately determined in the second stage. As a result, the peak of vibrations at the resonance frequency can be reduced during deceleration.

DESCRIPTION OF THE PREFERRED EMBODIMENTS

Figure 1:
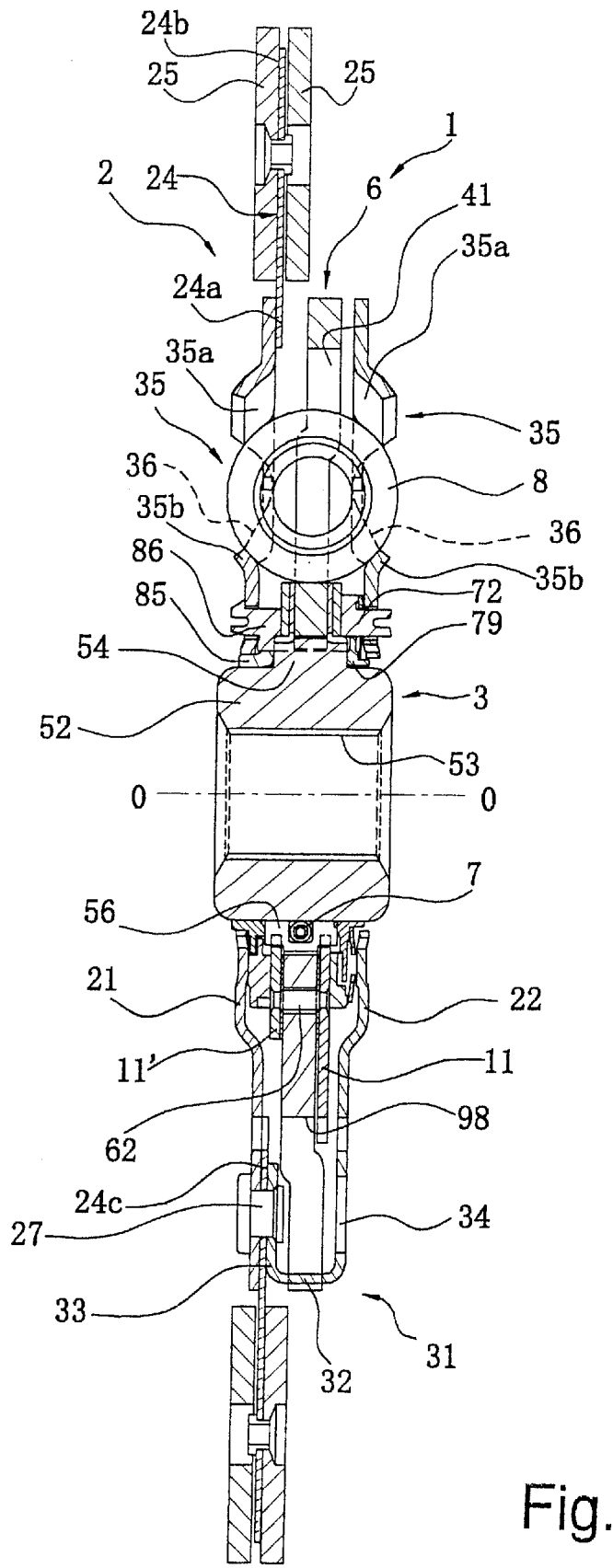
FIG. 1 is a schematic cross sectional side view of a clutch disk assembly having a damper mechanism in accordance with one embodiment of the present invention.
Figure 2:
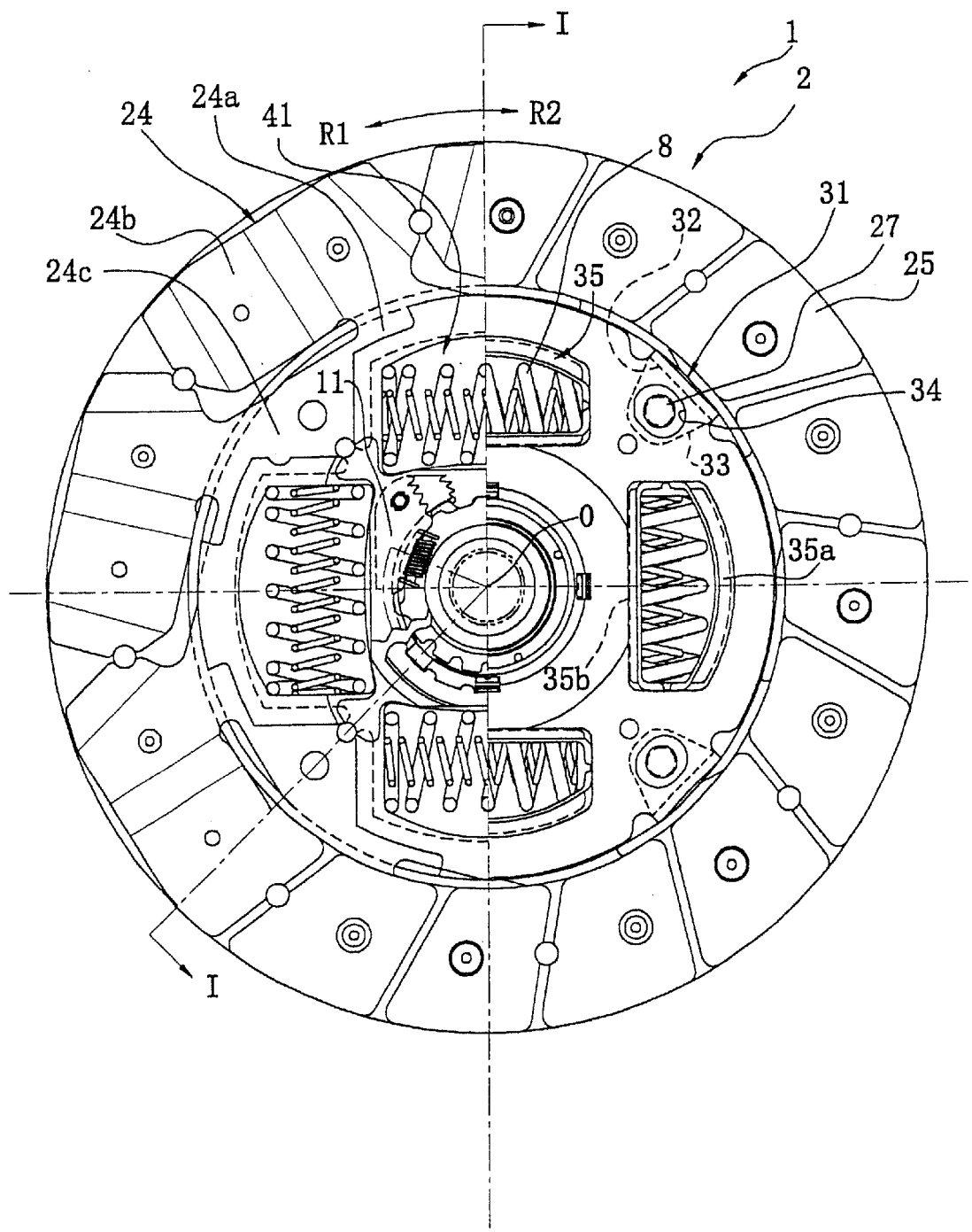
FIG. 2 is a part cutaway, part elevation end view of the clutch disk assembly depicted in FIG. 1.

FIG. 1 is a cross sectional side view of a clutch disk assembly 1 of one embodiment of the present invention and FIG. 2 is an end view of the same. The clutch disk assembly 1 is a power transmission device used in a clutch mechanism (not shown) of a vehicle (not shown), and has a clutch function and a damper function. With the clutch disk assembly 1 installed in a clutch mechanism, the clutch function includes engagement with and disengagement from a flywheel (not shown) for selectively transmitting torque to, for instance, a transmission (not shown) of the vehicle. The damper function is a accomplished by a damper mechanism (described in greater detail below) which absorbs and/or dampens torque variations, oscillations and vibrations, or the like, which are transmitted from the flywheel to the clutch disk assembly 1.

When the clutch disk assembly 1 is installed in a clutch mechanism (not shown), an engine (not shown) for producing torque and a flywheel (not shown) are positioned on the left side of FIG. 1 and the transmission (not shown) is positioned on the right side of FIG. 1. Hereinafter, the terms engine side and flywheel side both refer to the left side of FIG. 1. The term transmission side refers to the right side of FIG. 1.

In FIG. 1, 0—0 represents a rotary shaft of the clutch disk assembly 1, i.e., a rotation axis thereof. R1 is a rotation direction that indicates the direction torque is transmitted from the engine to the transmission and is also referred to as a positive rotational direction. R2 is a rotational direction opposite the direction torque is transmitted, by the engine and is also referred to as reverse or negative rotational direction. It should be understood that, during operation of a vehicle, negative and positive rotation occurs between the various portions (described below) of the clutch disk assembly 1. For instance, when torque is initially transmitted (when the clutch mechanism is first engaged) there will likely be positive rotation in the R1 direction as a result of torque being applied to the clutch disk assembly. Variations in torque will cause oscillations which in turn cause negative and positive rotation, as is described in greater detail below.

The clutch disk assembly 1 is basically formed of input rotary member 2 (a clutch plate 21, a retaining plate 22 and a clutch disk 23), an output rotary member 3 (hub) and a damper mechanism arranged between the input and output rotary members 2 and 3. The damper mechanism includes first springs 7, second springs 8, a large friction mechanism 13 and others.

The input rotary member 2 is a member which is supplied with torque from the flywheel (not shown). The input rotary member 2 is basically formed of the clutch plate 21, retaining plate 22 and clutch disk 23. The clutch plate 21 and the retaining plate 22 are both made of pressed circular or annular metal plates, and are axially spaced from each other by a predetermined distance. The clutch plate 21 is arranged on the engine side, and the retaining plate 22 is arranged on the transmission side. The clutch and retaining plates 21 and 22 are fixed together by plate-like coupling portions 31, described below, so that the predetermined space between the plates 21 and 22 is axially kept and the plates 21 and 22 can rotate together.

The clutch disk 23 is engagable with a surface of the flywheel (not shown). The clutch disk 23 is basically formed of a cushioning plate 24 as well as first and second friction facings 25. The cushioning plate 24 is formed of an annular portion 24a, a plurality of cushioning portions 24b formed on the outer periphery of the annular portion 24a. The cushioning portions 24b extend in the R1 direction from the annular portion 24a. The cushioning plate 24 also includes a plurality of coupling portions 24c extending radially inward from the annular portion 24a. The coupling portions 24c are four in number, and each are fixed to the clutch plate 21 by rivets 27, described below. The friction facings 25 are fixed to the opposite surfaces of each cushioning portion 24b of the cushioning plate 24 by rivets 26.

Each of the clutch and retaining plates 21 and 22 is provided proximate a radially outer portion thereof with four windows 35 which are equally spaced from each other in the rotating or circumferential direction. Each window 35 is provided at inner and outer peripheries thereof with cut and bent portions 35a and 35b, respectively. The cut and bent portions 35a and 35b are provided for restricting axial and radial movement of second springs 8 disposed in the windows 35, the second springs 8 further described below. Each window 35 is also provided at circumferentially opposite ends thereof with contact portions 36 which contact ends of the second springs 8, respectively, with the clutch disk assembly in a torsion free state. However, as will become clear from the description below, in response to relative rotary displacement between various members (described below) the contact portions 36 may come out of contact with one end of the second springs 8 under certain conditions.

The clutch and retaining plates 21 and 22 have central apertures 37 (inner peripheries). The output rotary member 3 (a spline hub) extends into the central apertures 37. The output rotary member 3 is formed of an axially extending cylindrical boss 52, and a flange 54 extending radially from the boss 52. The inner periphery of the boss 52 includes a spline aperture 53 engaged with a shaft (not shown) extending from the transmission (not shown). The flange 54 is provided with a plurality of outer teeth 55 that are arranged about an inner circumferential edge thereof. The inner circumferential edge of the flange 54 is also formed with recesses 56 for accommodating first springs 7, described further below. The recesses 56 are located at diametrically opposed two positions, respectively.

A separated flange 6 is a circular plate member which is arranged radially outside the output rotary member 3 and between the clutch and retaining plates 21 and 22. The separated flange 6 is elastically coupled to the output rotary member 3 in the rotating direction through the first springs 7, and is further coupled elastically to the input rotary member 2 through the second springs 8. As depicted more specifically in FIGS. 7 to 9, the separated flange 6 is provided at its inner periphery with a plurality of inner teeth 59.

The inner teeth 59 extend between the outer teeth 55, and are spaced by a predetermined angle in both the R1 and R2 directions from the outer teeth 55 with the clutch disk assembly in a torsion free state. The outer and inner teeth 55 and 59 can come into contact with each other in response to relative rotation therebetween, as is described in greater detail below. Thus, the outer and inner teeth 55 and 59 form a first stop 9 for restricting a torsion angle or relative rotary displacement angle range between the input rotary member 3 and the separated flange 6. The first stop 9 allows relative rotation between the teeth 55 and 59 within the confines of a predetermined angle.

A pair first space angles $\theta 1p$ and $\theta 1n$ (positive and negative rotation directions) are defined between each outer tooth 55 and the inner tooth 59 on each of the circumferentially opposite sides of the tooth 55. The first space angle $\theta 1p$ between each outer tooth 55 and the neighboring inner tooth 59 on the R2 side is about 8 degrees, and the first space angle $\theta 1n$ between each outer tooth 55 and the neighboring inner tooth 59 on the R1 side is about 2 degrees. As described above, the first space angles $\theta 1p$ and $\theta 1n$ are different from each other, and the angle $\theta 1p$ is larger than the angle θ1n. The two angles θ1n and θ1p when added together define the total torsion angle displacement possible between the teeth 55 and teeth 59.

The separated flange 6 is provided at its inner periphery with recesses 67 corresponding to the recesses 56 of the flange 54, respectively. Each of the first springs 7, which are two in total number, is installed in a corresponding one of the recesses 56 and a corresponding one of the recess 67 thereby elastically coupling the flange 54 to the separate flange 6. The first spring 7 is a soft coil spring (having a low level of stiffness), and the two first springs 7 operate in parallel. Each first spring 7 has circumferentially opposite ends that engage circumferentially opposite ends of the recesses 56 and 67 through spring seats 7a therebetween. According to the above structure, the first springs 7 are compressed in response to relative rotary displacement between the separated flange 6 and the output rotary member 3 within a range defined by the combination of the first space angle θ1n and θ1p.

Figure 5:
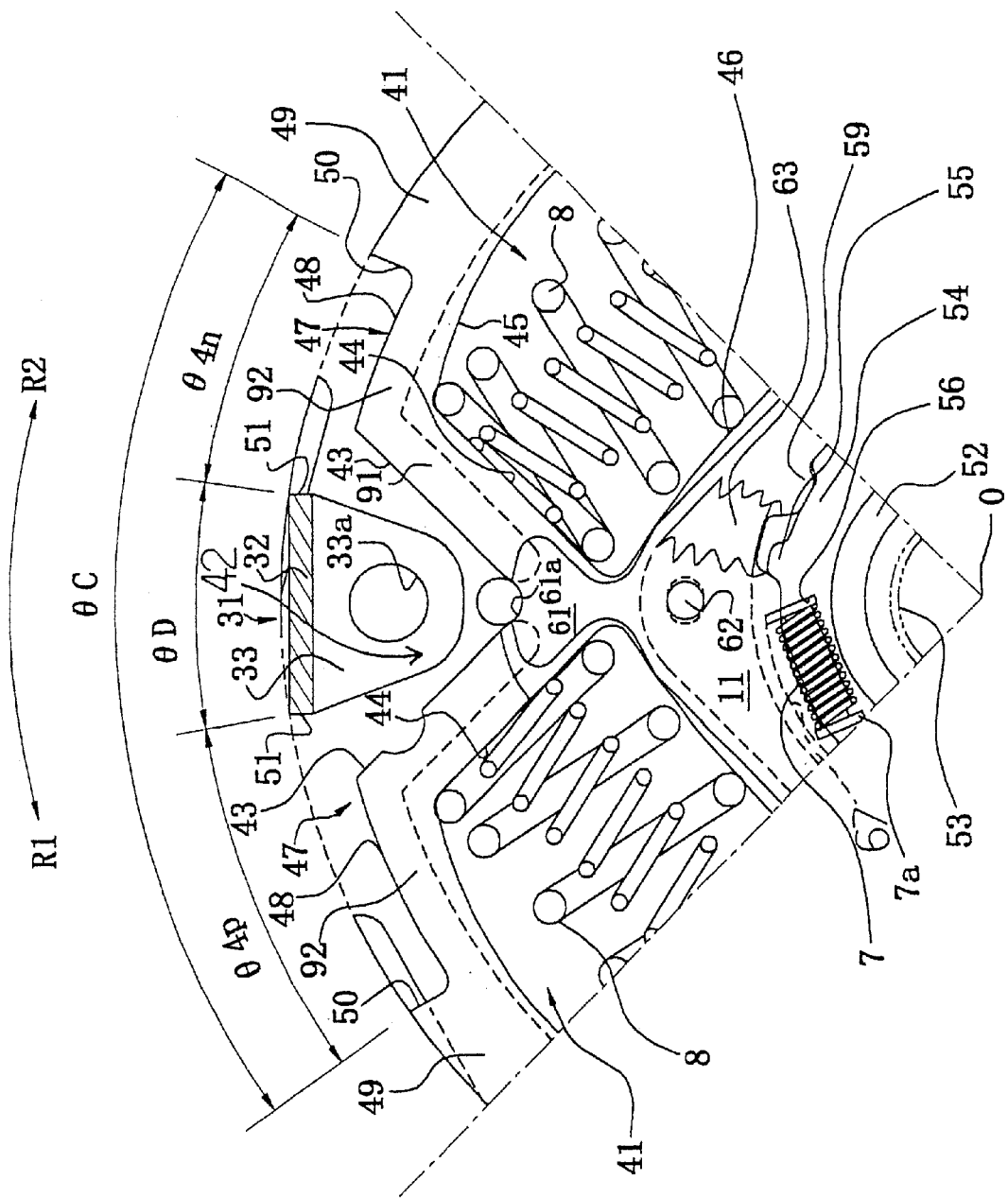
FIG. 5 is a fragmentary, part cutaway, part cross sectional end view of the clutch disk assembly depicted in FIG. 1, showing torsion angles of respective portions of the damper mechanism.
Figure 6:
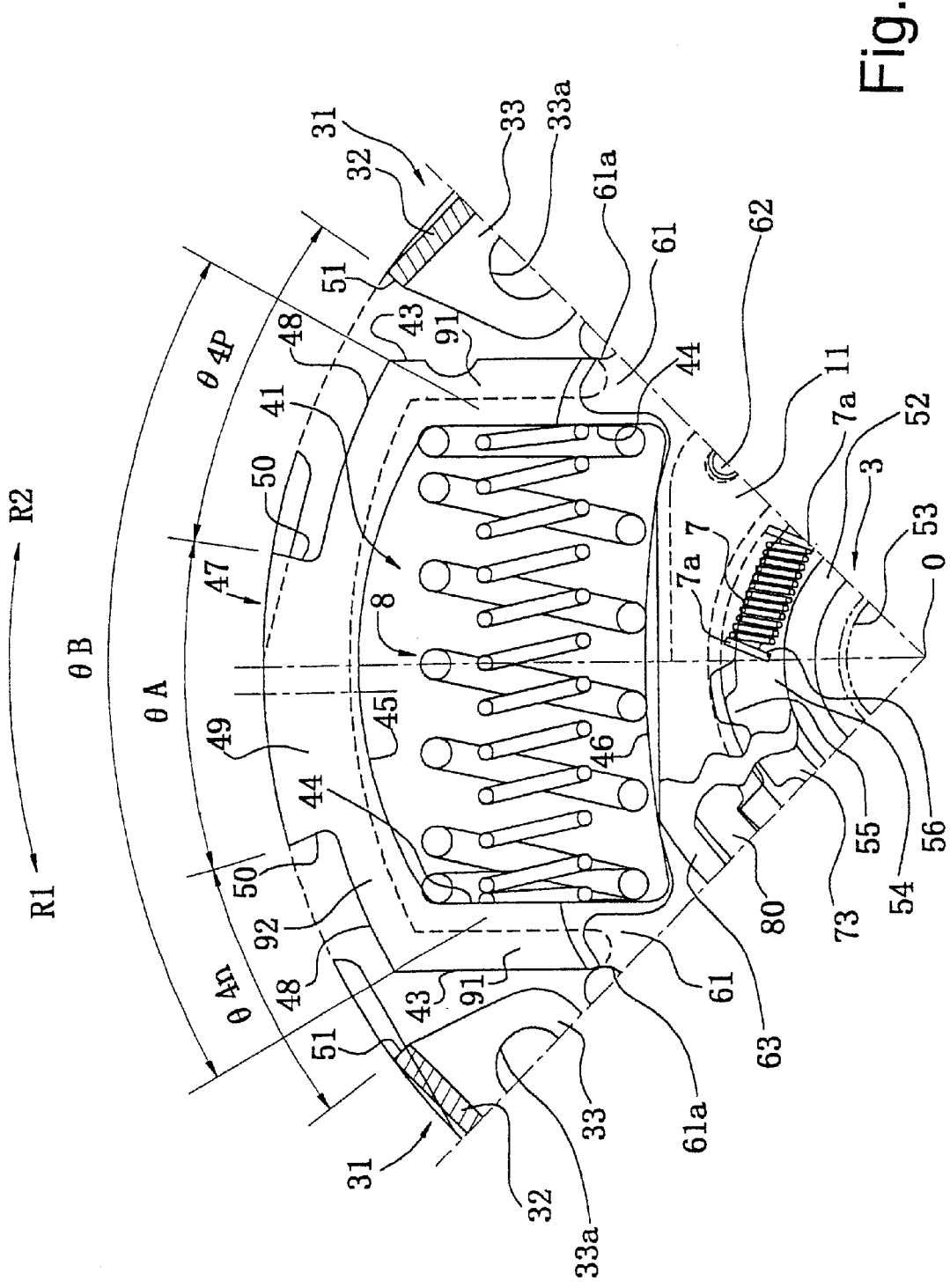
FIG. 6 is a fragmentary, part cutaway, part cross sectional end view of the clutch disk assembly depicted in FIG. 1, showing further torsion angles of respective portions of the clutch disk assembly.

The separated flange 6 is provided with circumferentially equally spaced four windows 41. Each window 41 extends in a circumferential direction. As shown in FIGS. 5 and 6, circumferentially opposite ends of the windows 41 form contact portions 44. Further, each window 41 has an outer peripheral portion 45 and an inner peripheral portion 46. The outer peripheral portion 45 of each window 41 extends continuously between the contact portions 44 to close the radially outer side of each corresponding window 41. It should be understood that the windows 41 may alternatively be formed with an outer peripheral portion that is partially opened radially outward.

The separated flange 6 is also provided with recesses 42 located between the circumferentially neighboring windows 41. Each recess 42 has a radially outwardly diverging form, and edge surfaces 43 are defined on circumferentially opposite sides thereof.

The separated flange 6 is also provided with projections 49 located radially outside the windows 41 parallel to the outer peripheral portion 45 of the windows 41. Each projection 49 extends radially outward from an outer periphery 48 of the separated flange 6. Each projection 49 is elongated in the circumferential or rotating direction. Opposite circumferential ends of each projection 49 are formed with stop surfaces 50 (stop portions). The circumferential length of each projection 49 is shorter than the circumferential length of the adjacent window 41. Further, each projection 49 is offset from a circumferential center of the adjacent window 41. Thus, corresponding stop surfaces 50 of each the projection 49 are circumferentially shifted from the neighboring edge surface 43 of the adjacent recess 42 and are also shifted circumferentially with respect to an adjacent contact portion 44 of the window 41. It is not necessary to center the projections 49 on a corresponding window 41. In other words, for each projection 49, the stop surface 50 on the R1 side of the corresponding window 41 is close to the adjacent edge surface 43 and the stop surface 50 on the R2 side of the corresponding window 41 is not so close to the adjacent edge surface 43.

It should be understood that alternatively, the window may be open radially outward and that the projections 49 may be formed in two parts sufficient to form the stop surfaces 50.

As was mentioned above, displacement between the output rotary member 3 and the separated flange 6 compresses the spring 7. Compression and expansion of the spring 7 (rotary displacement between the output rotary member 3 and the separated flange 6) defines a first stage of relative rotary displacement within the clutch disk assembly. Displacement between the separated flange 6 and the plates 21 and 22 causing compression of the springs 8 defines a second stage of relative rotary displacement in the clutch disk assembly.

The above structure of the separated flange 6 is now described below in another manner. The separated flange 6 has an annular portion in its radially inner side, and also has a plurality of projections 47 projecting radially outward from the annular portion. In this embodiment, the projections 47 are four in number and are equally spaced from each other in the rotating direction. Each projection 47 is elongated in the rotating direction, and is internally provided with one of the above described windows 41. Each window 41 occupies approximately 70% or more of a total area of the projection 47.

From further another viewpoint, each projection 47 can be considered to be in the form of two radially extending window frame portions 91 on the circumferentially opposite sides thereof, and a radially outer window frame portion 92 coupling the radially outer ends of the circumferentially opposite side frame portions 91 together. The circumferentially inner side of each side frame portion 91 forms the contact portion 44, and the circumferentially outer side thereof forms the edge surface 43. The radially inner side of the radially outer frame portion 92 forms the outer peripheral portion 45, and the radially outer side thereof forms the outer periphery 48. The projection 49, described above, is formed on the outer periphery 48. The recess 42, described above, is a space between the circumferentially opposite side frame portions 91 of the projections 47 neighboring each other in the rotating direction.

The second spring 8 is an elastic member, i.e., a spring used in the damper mechanism of the clutch disk assembly 1. Each second spring 8 is formed of a pair of coaxial coil springs. Each second spring 8 is larger than the first springs 7, and has a larger spring constant than the first spring 7. In other words, the second springs 8 are more rigid that the first springs 7 thereby requiring a greater force to compress. Each second spring 8 is arranged in the windows 41 and 35. The second spring 8 is circumferentially long, and extends throughout the window 41. Thus, the second spring 8 has a circumferential angle substantially equal to a circumferential angle θB (FIGS. 5 and 6) of the window 41, described below. The circumferentially opposite ends of each second spring 8 are in contact with or close to the contact surfaces 36 and the contact portions 44 of the window 41. Torque from the plates 21 and 22 can be transmitted to the separated flange 6 through the second springs 8. When the plates 21 and 22 rotate relative to the separated flange 6, the second springs 8 are compressed between them. More specifically, each second spring 8 is compressed in the rotating direction between the contact surface 36 and the contact portion 44 circumferentially opposed to the contact surface 36. In this operation, the four second springs 8 operate (are compressed) in parallel (at the same time).

The retaining plate 22 is provided at its outer periphery with the four plate-like coupling portions 31 which are equally spaced from each other in the circumferential direction. The plate-like coupling portions 31 couple the clutch and retaining plates 21 and 22 together, and form a portion of a second stop 10 in the clutch disk assembly 1, described in greater detail below. Each plate-like coupling portion 31 is a plate member integral with the retaining plate 22, and has a predetermined width in the rotating direction. The plate-like coupling portions 31 extend between each pair of adjacent the windows 41, i.e., through the recesses 42. Each plate-like coupling portion 31 is formed of a stop portion 32 extending axially from the outer periphery of the retaining plate 22, and a fixing portion 33 extending radially inward from the end of the stop portion 32. The stop portion 32 extends toward the clutch plate 21 from the outer periphery of the retaining plate 22. The fixing portion 33 is bent radially inward at the end of the stop portion 32. The plate-like coupling portion 31 is formed integrally with the retaining plate 22, and has the substantially same thickness as the retaining plate 22. The stop portion 32 extends in the circumferential direction such that a main surface thereof faces radially outward. However, the stop portion 32 has a small radial width corresponding to the thickness of the retaining plate 22. Opposite ends of each of the stop portions 32 define stop surfaces 51. Each of the fixing portion 33 extends radially inward from the corresponding stop portion 32 to a point approximately aligned with a radius that passes through a central portion of the windows 41, however, each of the fixing portions 33 are positioned circumferentially between adjacent pairs of the windows 41. As a result, with the clutch disk assembly in a torsion free state, each of the fixing portions 33 is aligned with a center of a corresponding one of the recesses 42 in the separated flange 6. The recess 42 is larger than the fixing portion 33 and therefore, the fixing portions 33 can be inserted through respective recesses 42 when the clutch disk assembly is assembled.

Each fixing portion 33 is parallel with the coupling portion 24c of the cushioning plate 24 and is in contact with a surface thereof on the transmission side. The fixing portion 33 is provided with an aperture 33a, into which the above mentioned rivet 27 is fitted. Each rivet 27 rigidly couples the fixing portion 33, the clutch plate 21 and the cushioning plate 22 together. The retaining plate 22 is provided with caulking apertures 34 at positions corresponding to the fixing portions 33, respectively.

Description is now given on the second stop 10 formed of the stop portions 32 of the plate-like coupling portions 31 and the projections 49. The second stop 10 is a mechanism for allowing relative rotation between the separated flange 6 and the input rotary member 2 through a region of a torsion angle θ4, and for restricting the relative rotation therebetween to within the torsion angle θ4. The second springs 8 are compressed between the separated flange 6 and the input rotary member 2 within the angular limit defined by the torsion angle θ4.

As shown in FIGS. 5 and 6, each plate-like coupling portion 31 is located in a position circumferentially between the two windows 41, within the recess 42 and circumferentially between the two projections 49. The stop surfaces 51 of each plate-like coupling portion 31 are located radially outside the outer periphery 48 of the separated flange 6. Thus, the stop portion 32 and the projection 49 are substantially the same radial distance from the center of the clutch disk assembly (the same distance from the axis 0—0). Therefore, the stop portion 32 and the projection 49 can come into contact with each other when the torsion angle between the separated flange 6 and the plates 21 and 22 increases. When the stop surface 51 of the stop portion 32 is in contact with the stop surface 50 of the projection 49, the stop portion 32 is located radially outside the projection 47 of the separated flange 6 and therefore radially outside the window 41. Thus, each stop portion 32 can move to a position radially outside the circumferentially inner portions of the projection 47 and the window 41.

Advantages of the second stop 10 described above are as follows. Since each stop portion 32 has a plate-like form, its circumferential angle or angular length is smaller than the conventional stop pin. The radial length of the stop portion 32 is significantly shorter than the conventional stop pin. Thus, the radial length of the stop portion 32 is substantially equal to the thickness of the plate 21 or 22. This means that the substantial radial length of the second stop 10 is restricted to a short value corresponding to the thickness of the plate 21 or 22.

Each stopper portion 32 is located in the outer peripheral portions, i.e., the radially outermost positions of the plates 21 and 22, and each is located radially outside but adjacent to a corresponding projection 47 and particularly the outer periphery 48 of the window 41. Since the stopper portion 32 is able to move in circumferential directions radially outward from the window 41, there is no interference between the stop portion 32 and the window 41. Consequently, it is possible to maximize the torsion angle of the damper mechanism (the relative rotary displacement between the various members of the damper mechanism). Further, it is possible to maximize the amount of compression of each of the second springs 8. If the stop portion 32 were located at a position radially inward at a position circumferentially adjacent to the windows, there would be interference between the stop portion 32 and the springs in the windows thereby limiting the possible torsion angle of the damper mechanism. Therefore, the configuration of the present invention, with the stop portion 32 being located radially outward from the windows 41 makes it possible to achieve a wide torsion angle of relative rotary displacement between the various members of the damper mechanism.

In particular, since the radial thickness of the second stop 10 (for instance, the thickness of the stop portion 32) is significantly shorter than that of a conventional stop pin, the configuration of the second stop 10 arranged radially outside the window 41 does not appreciably increase the outer diameters of the plates 21 and 22 (or of the damper mechanism in general). Also, the radial thickness of the window 41 is not appreciably reduced.

A fourth space angle θ4p is defined between each projection 49 and the neighboring stop portion 32 on the R2 side thereof, and a fourth space angle θ4n is defined between each projection 49 and the neighboring stop portion 32 on the R1 side thereof. With the clutch disk assembly in a torsion free state (at rest, with no torque applied) the fourth space angle θ4p is 26 degrees and the fourth space angle θ4n is about 23.5 degrees. As described above, the fourth space angles 4p and 4n are different from each other, with the angle θ4p being larger than the angle θ4n with the clutch disk assembly in a torsion free state. For achieving the above relationship between 4p and 4n, each projection 49 is circumferentially offset from the circumferential center of windows 41 and is therefore similarly offset from the stop portions 32. More specifically, the circumferential center of the projection 47 is shifted toward the R1 side from a circumferential midpoint between adjacent stop portions 32.

There are two intermediate plates 11 and 11' that are a pair of plate members located radially outside the output rotary member 3, and the plate 11' is disposed between the clutch plate 21 and the separated flange 6 and the plate 11 is disposed between the separated flange 6 and the retaining plate 22. The intermediate plates 11 and 11' are circular or annular plate members, respectively, and form a portion of the damper mechanism operable between the input and output rotary members 2 and 3. Each intermediate plate 11 and 11' is provided at its inner periphery with a plurality of inner teeth 66. The inner teeth 66 axially overlap the inner teeth 59 of the separated flange 6.

Figure 7:
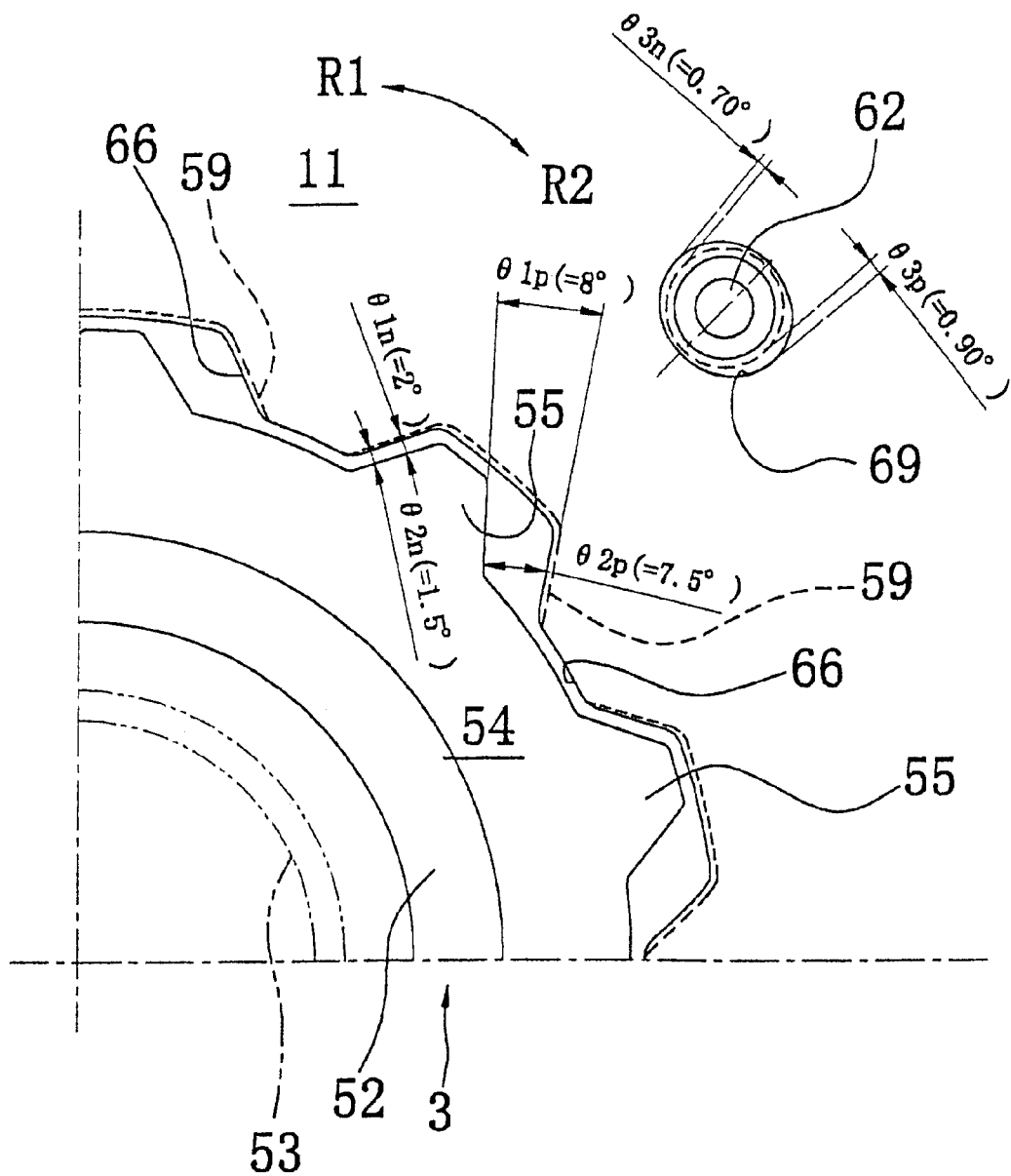
FIG. 7 is a fragmentary cutaway end view of radially inward portions of the clutch disk assembly depicted in FIG. 1, showing further various torsion angles with the clutch disk assembly in a torsion free state.

As shown in FIGS. 5, 6 and 7, each inner tooth 66 is circumferentially longer than each inner tooth 59, and with the damper mechanism in a torsion free state, circumferentially opposite ends of the inner teeth 66 extend slightly beyond each adjacent tooth 59 toward the outer teeth 55. The inner teeth 66 are spaced in the rotating direction by a predetermined distance from the outer teeth 55 of the output rotary member 3, respectively. Through the range of this space, therefore, the output rotary member 3 and the intermediate plates 11 and 11'can rotate relative to each other. The outer and inner teeth 55 and 66 form a third stop 12 for restricting the relative rotation angle between the output rotary member 3 and the intermediate plates 11 and 11'. More specifically, as shown in FIG. 7, an angular space designated as second space angles $\theta 2p$ and $\theta 2n$ are maintained between each outer tooth 55 and each of the inner teeth 66 on the circumferentially opposite sides thereof with the damper mechanism in a torsion free state. The second space angle $\theta 2p$ between each outer tooth 55 and the neighboring inner tooth 66 on the R2 side is about 7.5 degrees, and the second space angle $\theta 2n$ between each outer tooth 55 and the neighboring inner tooth 66 on the R1 side is about 1.5 degrees (with the damper mechanism at rest in a torsion free state).

As described above, the second space angles $\theta 2p$ and $\theta 2n$ are different from each other, and the angle $\theta 2p$ is larger than the angle $\theta 2n$. The second space angle $\theta 2p$ is smaller than the first space angle $\theta 1p$, and the second space angle $\theta 2n$ is smaller than the first space angle $\theta 1n$.

Figure 4:
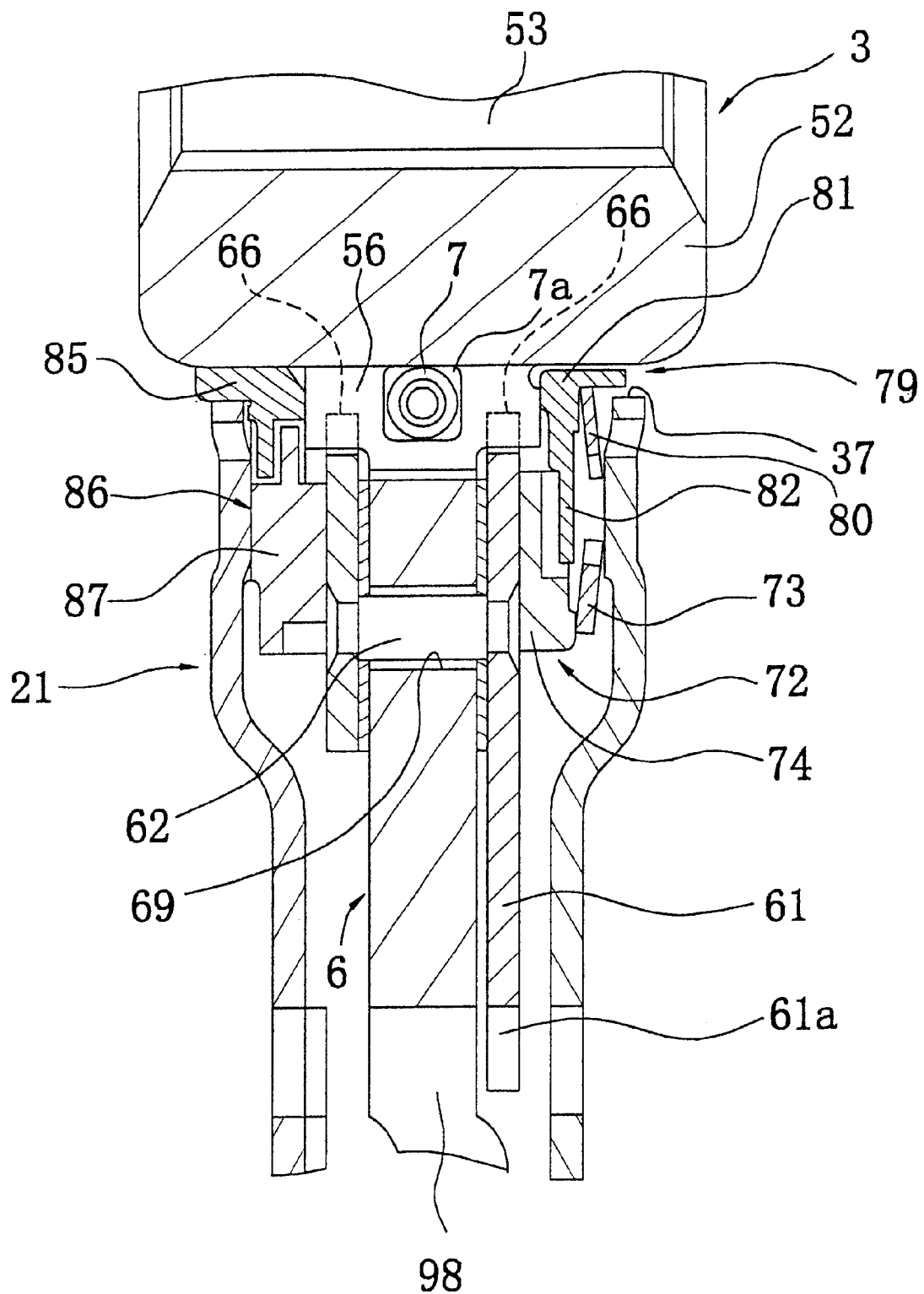
FIG. 4 is a fragmentary, cross sectional side view of another portion of the clutch disk assembly depicted in FIG. 1, on a slightly enlarged scale.

The intermediate plates 11 disposed adjacent to the retaining plate 22 is provided with a plurality of radial projections 61 (FIGS. 5 and 6). Each projection 61 extends radially outward between the windows 41 of the separated flange 6 with the damper mechanism in a torsion free state. Each projection 61 is provided a radial outward end there of with a semicircular recess 61a. The recess 61a is formed at a radial position that is aligned with a corresponding a recess 98 formed in the separate flange 6 when the clutch disc assembly is in a torsion free state. The recess 61a is also aligned with apertures formed in the plates 21 and 22 with the clutch disc assembly in a torsion free state (as shown in FIGS. 1, 4 and 5). The apertures formed in the plates 21 and 22, and the recesses 61a and 98 may be used when the clutch disk assembly is assembled to retain the separate plate 6, the plates 11 and 11' and the plates 21 and 22 in position.

The paired intermediate plates 11 and 11' are non-rotatably coupled together by a plurality of pins 62 such that the pins 62 prevent axial movement between the plates 11 and 11'. Each pin 62 is formed of a shank and heads that extend axially from opposite ends of the shank. The paired intermediate plates 11 and 11' are in axial contact with the end surfaces of shanks of the pins 62 and thereby are prevented from axially moving toward each other. The heads of each pin 62 are fitted into apertures formed in the plates 11 and 11', respectively, and thereby hold the intermediate plates 11 and 11' together with its shank. A spacer 63 (FIG. 3) is arranged between each intermediate plate 11' and the separated flange 6. Each spacer 63 is an annular plate member which is arranged between the radially inner portion of the intermediate plate 11' and the radially inner annular portion of the separated flange 6. The spacer 63 is provided with a plurality of apertures through which the shanks of pins 62 extend, respectively, and can rotate together with the intermediate plate 11' owing to engagement of the pins 62 in these apertures. Coating is applied to a surface of the spacer 63, which is in contact with the flange 6, for reducing the friction coefficient. The separated flange 6 is provided with a plurality of apertures 69 through which the pins 62 extend, respectively.

The pin 62 allows movement within a predetermined angular range in circumferentially opposite directions with respect to the aperture 69. Third space angles $\theta 3n$ and $\theta 3p$ are defined between the shank of the pin 62 and the circumferentially opposite edges of the aperture 69, respectively. Thereby, a fourth stop 14 is formed. A third space angle $\theta 3p$ is formed between each pin 62 and the edge of the aperture 69 on the R2 side. Also, a third space angle $\theta 3n$ is formed between each pin 62 and the edge of the aperture 69 on the R1 side. The third space angles 3p and 3n are different in magnitude from each other. For example, the angle $\theta 3p$ in one embodiment is 0.90 degrees, and the angle $\theta 3n$ is 0.70 degrees. It should be appreciated that these angular values are only one example. Various angular ranges are possible.

The relative position relationship between the pin 62 and the aperture 69 described above means that the pin 62 is offset slightly toward the R2 side with respect to the aperture 69 when the respective portions are in the neutral positions shown in FIG. 7 (where the clutch disk assembly is in a torsion free state). More specifically, the circumferential center of the pin 62 is offset toward the R2 side with respect to the circumferential center of the aperture 69. This positional relationship can be achieved by shifting the position of the pin 62, or by providing the aperture 69 having different sizes on the circumferentially opposite sides in the separated flange, respectively.

Figure 3:
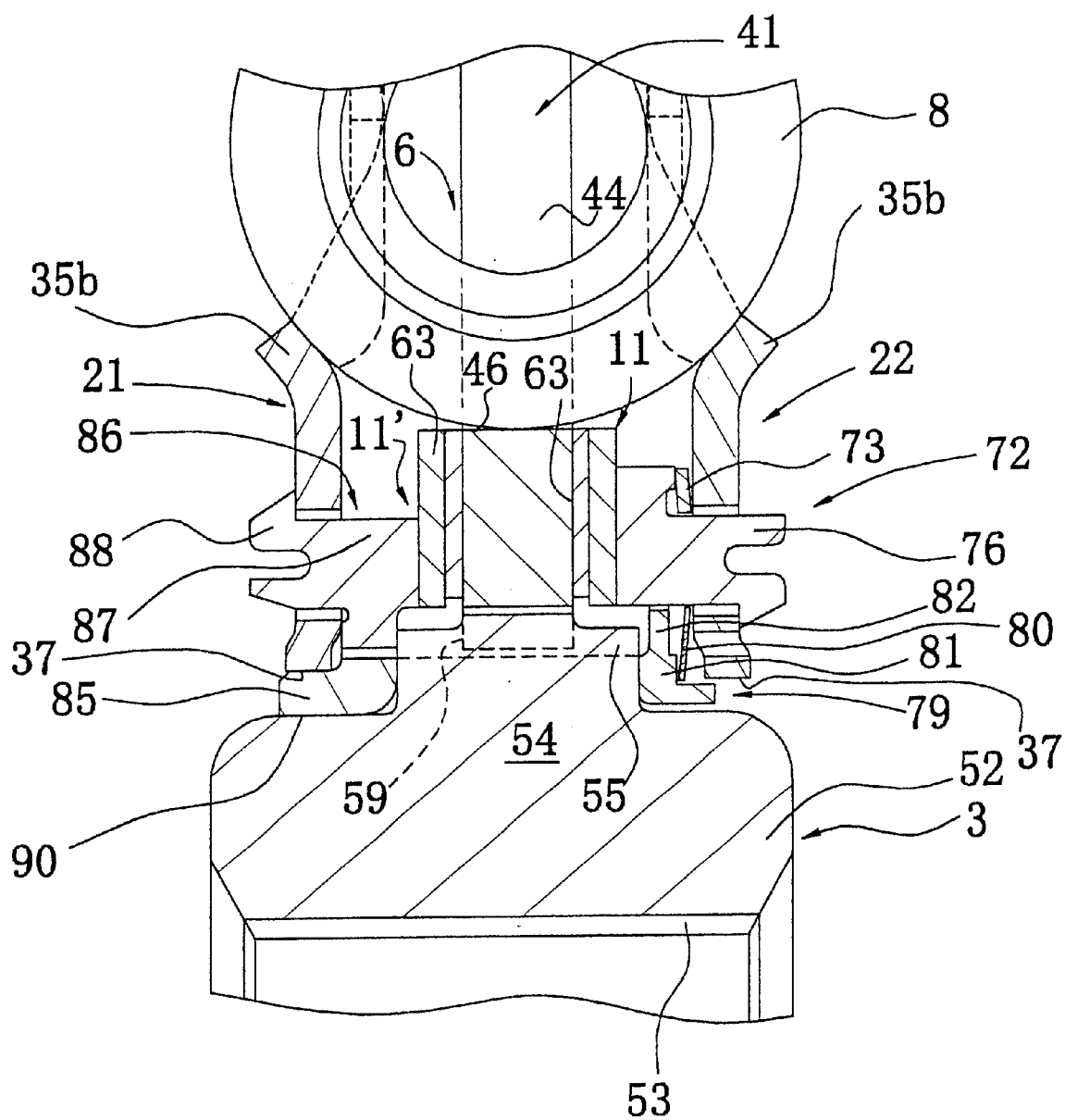
FIG. 3 is a fragmentary, cross sectional side view of a portion of the clutch disk assembly depicted in FIG. 1, on a slightly enlarged scale.

Description is now given on members forming the friction generating mechanism. The second friction washer 72 is arranged between the inner peripheral portion of the intermediate plate 11 on the transmission side thereof and the inner peripheral portion of the retaining plate 22, as shown in FIG. 3. The second friction washer 72 is basically formed of a body 74 made of resin. The friction surface of the body 74 is in contact with a surface of the intermediate plate 11 on the transmission side thereof. Engagement portions 76 extend from the inner peripheral portion of the body 74 toward the transmission side. The engagement portions 76 are unrotatably engaged with the retaining plate 22, and are axially fitted to the plate 22. A plurality of concavities 77 are formed in the transmission side of the inner peripheral portion of the body 74.

A second conical spring 73 is disposed between the body 74 and the retaining plate 22. The second conical spring 73 in the assembled state is compressed between the body 74 of the second friction washer 72 and the retaining plate 22. Thereby, the friction surface of the second friction washer 72 is strongly pressed against the first intermediate plate 11. A first friction washer 79 is arranged between the flange 54 and the inner peripheral portion of the retaining plate 22. Thus, the first friction washer 79 is arranged radially inside the second friction washer 72 and radially outside the boss 52.

The first friction washer 79 is made of resin. The first friction washer 79 is basically formed of an annular body 81, from which a plurality of projections 82 extend radially outward. The body 81 is in contact with the flange 54, and the projections 82 are unrotatably engaged with the concavities 77 of the second friction washer 72, as shown in FIG. 4. Thereby, the first friction washer 79 can rotate together with the retaining plate 22 with the second friction washer 72 therebetween.

A first conical spring 80 is arranged between the first friction washer 79 and the inner peripheral portion of the retaining plate 22. The first conical spring 80 in the assembled state is axially compressed between the first friction washer 79 and the inner peripheral portion of the retaining plate 22. Such a design is employed that the biasing force of the first conical spring 80 is smaller than the biasing force of the second conical spring 73. The first friction washer 79 is made of the material having a smaller friction coefficient than the second friction washer 72. Accordingly, the friction (hysteresis torque) produced by the first friction washer 79 is significantly smaller than the friction produced by the second friction washer 72.

Third and fourth friction washers 85 and 86 are arranged between the inner peripheral portion of the clutch plate 21, and the flange 54 and the inner peripheral portion of the intermediate plate 11, as shown in FIG. 4. The third and fourth friction washers 85 and 86 are annular members made of resin. The third friction washer 85 is rotatably engaged with the inner periphery of the clutch plate 21, and has an inner peripheral surface which is in slidable contact with the outer peripheral surface of the boss 52. More specifically, the clutch plate 21 is radially positioned by the boss 3 via the third washer 85. The third washer 85 is in axial contact with the engine-side surface of the flange 54. The fourth friction washer 86 is arranged radially outside the third friction washer 85. The fourth friction washer 86 has an annular body 87 and a plurality of engagement portions 88 which extend axially toward the engine from the annular body 87, as shown in FIG. 3.

The annular body 87 has a friction surface which is in axial contact with the intermediate plate 11 on the engine side. The engagement portions 88 are non-rotatably engaged with apertures formed in the clutch plate 21, respectively. Each engagement portion 88 has a claw which is in axial contact with the engine-side surface of the clutch plate 21. The third and fourth friction washers 85 and 86 are non-rotatably engaged with each other. The third and fourth friction washers 85 and 86 are made of independent members, respectively. The fourth friction washer 86 is made of a material having a higher friction coefficient than a material of the third friction washer 85.

In the foregoing friction mechanisms, the large friction mechanism 13 (friction mechanism) which generates a relatively high hysteresis torque is formed by the second friction washer 72, fourth friction washer 86 and intermediate plate 11. The small friction mechanism 15 which generates a relatively low hysteresis torque is formed by the first friction washer 79, third friction washer 85 and flange 54.

Angles and relationships relating to the second springs 8 and the second stop 10 will now be described below more in detail. The "circumferential angle" in the following description means the angle in the circumferential direction (i.e., rotating direction of the clutch disk assembly 1) between two positions around the rotation axis 0—0 of the clutch disk assembly 1. The absolute values of the angles, which will be used in the following description, are merely examples in the clutch disk assembly shown in the figures, and the invention is not restricted to these values.

Relationship Between $\theta A$ and $\theta C$

The circumferential angle $\theta A$ (FIG. 6) of each projection 49 is smaller than the circumferential angle $\theta C$ (FIG. 5) between the neighboring circumferential ends of the circumferentially neighboring projections 49 (i.e., between the circumferentially opposed stopper surfaces 50). The angles A and C establish such a relationship that one increases as the other decreases. The angle $\theta A$ employed in this embodiment is much smaller than the angle $\theta C$, whereby $\theta C$ is increased above the conventional value. By increasing the circumferential angle $\theta C$ between the projections 49, it is possible to increase the space angle $\theta 4$ ($\theta 4p+\theta 4n$) of the separated flange 6 with respect to the plates 21 and 22.

The angle $\theta C$ of 40 degrees or more can achieve a superior effect which cannot be achieved in the prior art. The angle $\theta C$ ranging from 50 to 80 degrees can improve the effect, the angle $\theta C$ ranging from 60 to 80 degrees can further improve effect, and the angle $\theta C$ ranging from 65 to 75 degrees can achieved the best effect.

The angle $\theta A$ of ½ or less of C can achieve a sufficient effect. The angle $\theta A$ of ⅓ or less of C can further improve the effect.

Relationship Between $\theta C$ and $\theta D$

The circumferential angle $\theta D$ of each plate-like coupling portion 31 (stopper portion 32) is much smaller than the foregoing angle $\theta C$. A difference obtained by subtracting $\theta D$ from $\theta C$ is equal to the maximum allowable space angle $\theta 4$ ($\theta 4p+\theta 4n$), stopper angle of the damper mechanism) between the separated flange 6 and the plates 21 and 22. Thus, the damper mechanism has the maximum space torsion angle $\theta 4$ larger than that in the prior art. It can be seen from FIG. 20 that it is necessary to increase $\theta C$ and decrease $\theta D$ for increasing $\theta 4$. In this embodiment, $\theta D$ is 18 degrees. The angle $\theta D$ is preferably 20 degrees or less, and more preferable is in a range from 10 to 20 degrees.

When $\theta D$ is ½ or less of $\theta C$, $\theta D$ can be sufficiently large. If $\theta D$ is ⅓ of $\theta C$, $\theta 4$ can be further large. If $\theta D$ is ¼ or less of $\theta C$, $\theta 4$ can be the maximum.

In this embodiment, $\theta 4$ is equal to 58.5 degrees. $\theta E$ is preferably equal to 20 degrees or more. $\theta E$ is more preferably equal to 30 degrees or more. Particularly, if it is in a range from 40 to 60 degrees, it is possible to achieve a sufficiently wide angle which cannot be achieved in the prior art. It is further preferably in a range from 55 to 60 degrees.

Increase in allowed maximum torsion angle $\theta 4$ achieves the following advantages. By increasing the allowed maximum torsion angle, the rigidity of the springs (second springs 8) for the second stage in the torsion characteristics can be reduced without lowering the stop torque. In this embodiment, the rigidity of the second springs 8 is reduced to about 50% of that in the prior art. This can reduce a shock which may occur during transition from the first stage to the second stage (i.e., initial upward shock caused when depressing the accelerator).

Relationship Between $\theta B$ and $\theta D$

The windows 41 formed in the separated flange 6 are four in total number, and each window 41 has the circumferential angle $\theta B$ of 50 degrees or more. The angle $\theta B$ is determined between the radially middle portions of the contact portions 44. In the figure, the angle $\theta B$ is equal to 59 degrees. Consequently, it is possible to use the springs, which are sufficiently long in the rotating direction, and thus allow the large maximum torsion angle. The angle $\theta B$ is preferably in a range from 50 to 70 degrees, and more preferably in a range from 55 to 65 degrees.

The circumferential angle $\theta D$ of each projection 49 is smaller than the circumferential angle $\theta B$ of the window 41. This means that the ratio of $\theta 4$ to $\theta B$ is sufficiently large. The window 41 and the second spring 8 are increased in angle, and further the maximum torsion angle of the damper mechanism is sufficiently increased, whereby the function of the springs is effectively utilized, and it is possible to provide the characteristics of the further large torsion angle and the further low torsional rigidity.

If $\theta D$ is equal to ½ or less of $\theta B$, a sufficient effect can be achieved. If $\theta D$ is equal to ⅓ or less of $\theta B$, a further sufficient effect can be achieved.

Relationship Between $\theta A$ and $\theta B$

The circumferential angle $\theta A$ of each projection 49 is smaller than the circumferential angle $\theta B$ of each window 41. The fact that a ratio of θA to θB is smaller than that in the prior art means that a ratio of θC to θB is larger than that in the prior art. In other words, the ratio of θC to θB can be sufficiently increased to satisfy the precondition that the maximum allowable space angle θ4 can be increased with the windows 41 allowing the large maximum torsion angle. The circumferential angle θA of each projection 49 which is ⅔ or less of θB can achieve a sufficient effect. The angle θA of ½ or less of θB is more preferable, and the angle θA of ⅓ or less is further preferable.

Relationship Between θB and θ4

Both the angles θ4 and θB are larger than those in the prior art, and thus both the maximum allowable torsion angles of the damper mechanism and the torsion angle of the second spring 8 are large. Increase in size of the second springs 8 facilitates design thereof, and improves their performance (large torsion angle and low rigidity).

From comparison between θB and θ4, there is substantially no difference between them. Thus, a ratio of θB to θ4 is sufficiently large. As a result, it is possible to provide the maximum space angle θ4 which can sufficiently utilize the large torsion angle allowed by the windows 41 and therefore the second springs 8.

Radial Length of Window 41

In this damper mechanism, the window 41 has a radial length sufficiently larger than the radial length of the separated flange 6. This allows increase in size of the second springs 8 accommodated in the windows 41, respectively. The radial length of the window 41 is 35% or more of the radius of the separated flange 6. If the ratio is in a range from 35% to 55%, an intended effect can be sufficiently achieved, and the range from 40 to 50% can further achieve the effect.

Figure 10:
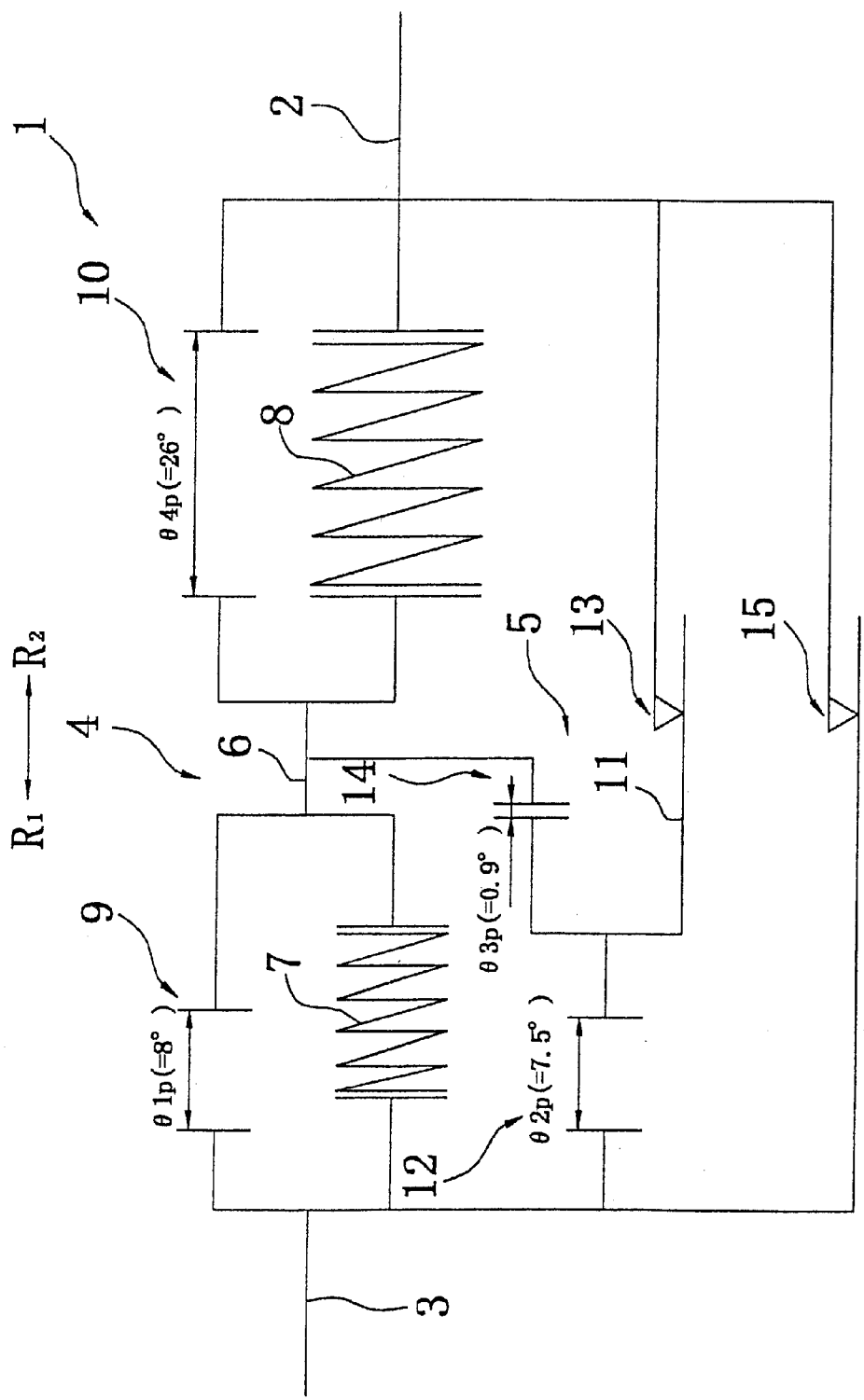
FIG. 10 is a mechanical circuit diagram schematically showing operable relationships between various portions of the damper mechanism in the clutch disk assembly.

The structure of the clutch disk assembly 1 is described below more in detail with reference to FIG. 10. FIG. 10 is a mechanical circuit diagram of the damper mechanism of the clutch disk assembly 1. The mechanical circuit diagram in FIG. 10 schematically shows the relationships of the respective parts of the damper mechanism as they rotate in the rotating direction R1, which corresponds to the positive p side of all angular displacement ranges. Accordingly, the parts which rotate together are depicted as a single part or single assembly.

As can be seen in FIG. 10, a plurality of members forming the damper mechanism are arranged between the input and output rotary members 2 and 3. The separated flange 6 is arranged circumferentially between the input and output rotary members 2 and 3. The separated flange 6 is circumferentially and elastically coupled to the output rotary member 3 through the first springs 7. The first stop 9 is formed between the separated flange 6 and the output rotary member 3. The first springs 7 can be compressed through the first space angle θ1p in the first stop 9. The separated flange 6 is circumferentially and elastically coupled to the input rotary member 2 through the second springs 8. The second stop 10 is formed between the separated flange 6 and the input rotary member 2. The second springs 8 can be compressed through the fourth space angle θ4p in the second stop 10. As described above, the input and. output rotary members 2 and 3 are elastically coupled together in the rotating direction through the first and second springs 7 and 8 arranged in series. In this structure, the separated flange 6 functions as an intermediate member arranged between the two different types of springs.

The structure described above is therefore divided into a first damper formed of the first springs 7 and the first stop 9 operate in parallel with one another, and operate in series with the combination of the second damper formed of the second springs 8 and the second stop 10, which operate in parallel with one another. The structure described above (springs 7 and stop 9, and the springs 8 and stop 10) can also be considered to be a single damper mechanism 4 which elastically couples the input and output rotary members 2 and 3 together in the rotating direction. The rigidity of the first springs 7 is significantly smaller than the rigidity of the second springs 8. Therefore, the second springs 8 are hardly compressed in the rotating direction within an angle range smaller than the first space angle θ1.

The intermediate plate 11 is arranged circumferentially between the input and output rotary members 2 and 3. The intermediate plate 11 is rotatably arranged between the output rotary member 3 and the separated flange 6. The intermediate plate 11 forms the third stop 12 with respect to the output rotary member 3, and also forms the fourth stop 14 with respect to the separated flange 6. The intermediate plate 11 is frictionally engaged in the rotating direction with the input rotary member 2 via the large friction mechanism 13. The intermediate plate 11 which is arranged between the input rotary member 2, output rotary member 3 and separated flange 6 as described above forms a frictional coupling mechanism 5.

The damper mechanism 4 and the friction coupling mechanism 5 operate in parallel with one another, as is described further below.

Description is now be given on relationships between the space angles θ1p–θ4p of the damper mechanisms shown in FIG. 10. The space angles described below are determined between the output rotary member 3 and the input rotary member 2 on the R2 side of the output rotary member 3. The first space angle θ1p in the first stop 9 corresponds to an angular range in which the first spring 7 is circumferentially compressible, and the fourth space angle θ4p in the second stop 10 corresponds to the angular space in which the second spring 8 is compressible in the rotating direction R1. A sum of the first and fourth space angles θ1p and θ4p is equal to the maximum allowed positive torsion angle of the damper mechanism in the whole clutch disk assembly 1.

A positive second space angle θACp is defined as a portion of the positive angular displacement range where the operation of the large friction mechanism 13 is suppressed (see FIG. 8) when minute torsional vibrations are supplied in the positive second stage of the torsion characteristics. The second space angle θACp is obtained by subtracting from the value of the third space angle θ3p, the value obtained by subtracting from the second space angle θ2p the value of first space angle θ1p, as in the equation below.

$$\theta ACp = (\theta 3p - (\theta 1p - \theta 2p))$$

The positive second space angle θACp in this embodiment is equal to 0.4 degrees, and therefore is much smaller than that in the prior art. The positive second space angle θACp is preferably in a range from 0.3 to 0.5 degrees.

Figure 20:
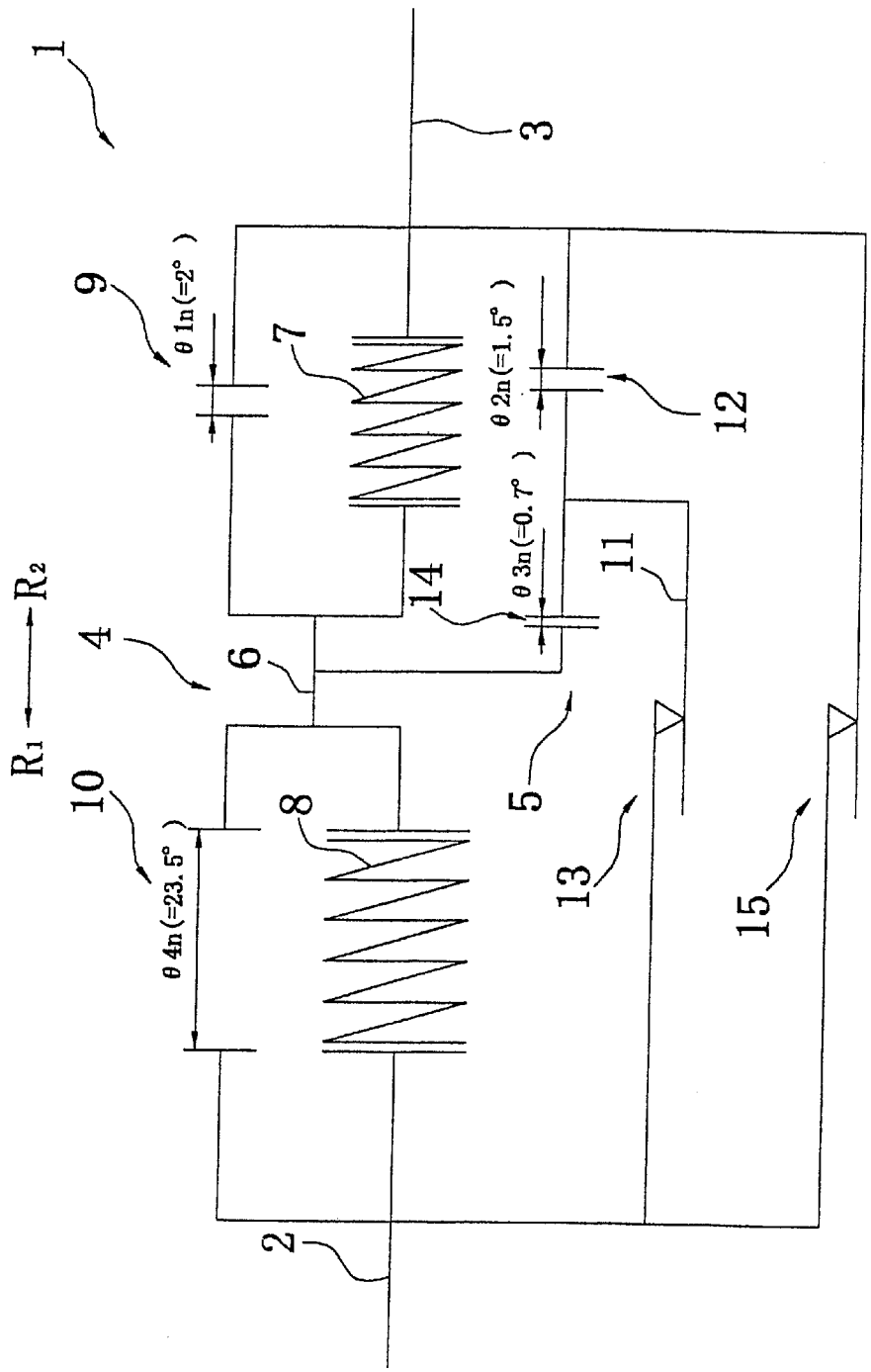

Description is now be given on relationships between the space angles θ1n–θ4n of the damper mechanisms shown in FIG. 20. The space angles described below are determined between the output rotary member 3 and the input rotary member 2 on the R1 side of the output rotary member 3. The first space angle θ1n in the first stop 9 corresponds to an angular range in which the first spring 7 is circumferentially compressible, and the fourth space angle θ4n in the second stop 10 corresponds to the angular space in which the second spring 8 is compressible in the rotating direction R1. A sum of the first and fourth space angles θ1n and θ4n is equal to the allowed maximum negative torsion angle of the damper mechanism in the whole clutch disk assembly 1.

A negative second space angle θACn is defined as a portion of the negative angular displacement range where the operation of the large friction mechanism 13 is suppressed (see FIG. 9) when minute torsional vibrations are supplied in the negative second stage of the torsion characteristics. The second space angle θACn is obtained by subtracting from the value of the third space angle θ3n, the value obtained by subtracting from the second space angle θ2n the first space angle θ1n, as in the equation below.

$$θACn=(θ3n-(θ1n-θ2n))$$

The negative second space angle θACn in this embodiment is equal to 0.2 degrees, and therefore is much smaller than that in the prior art. The negative second space angle θACn is preferably in a range from 0.15 to 0.25 degrees.

Figure 8:
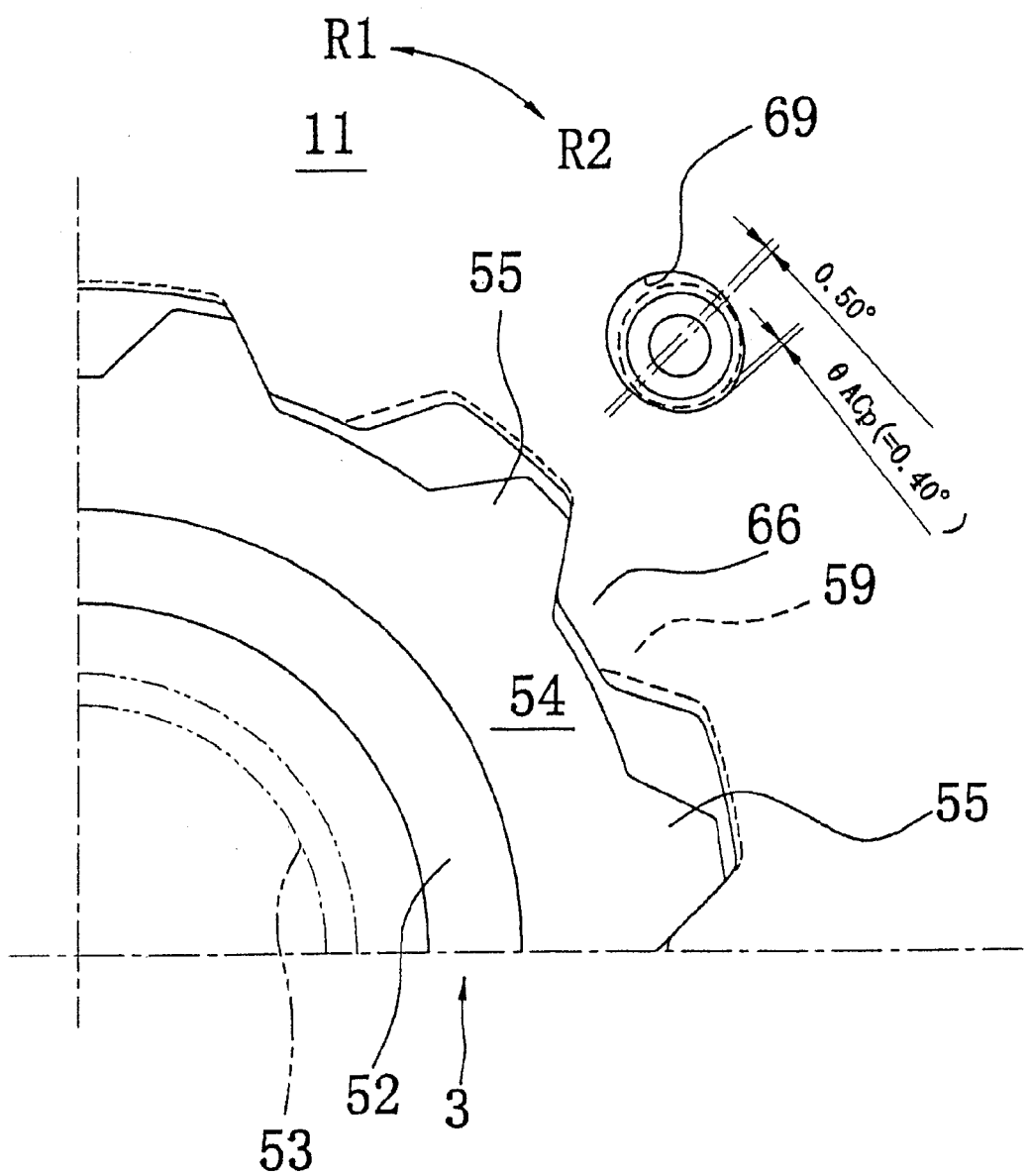
FIG. 8 is a fragmentary cutaway end view similar to FIG. 7 showing plates of the clutch disk assembly rotated in an R1 direction with respect to a hub of the clutch disk assembly.
Figure 9:
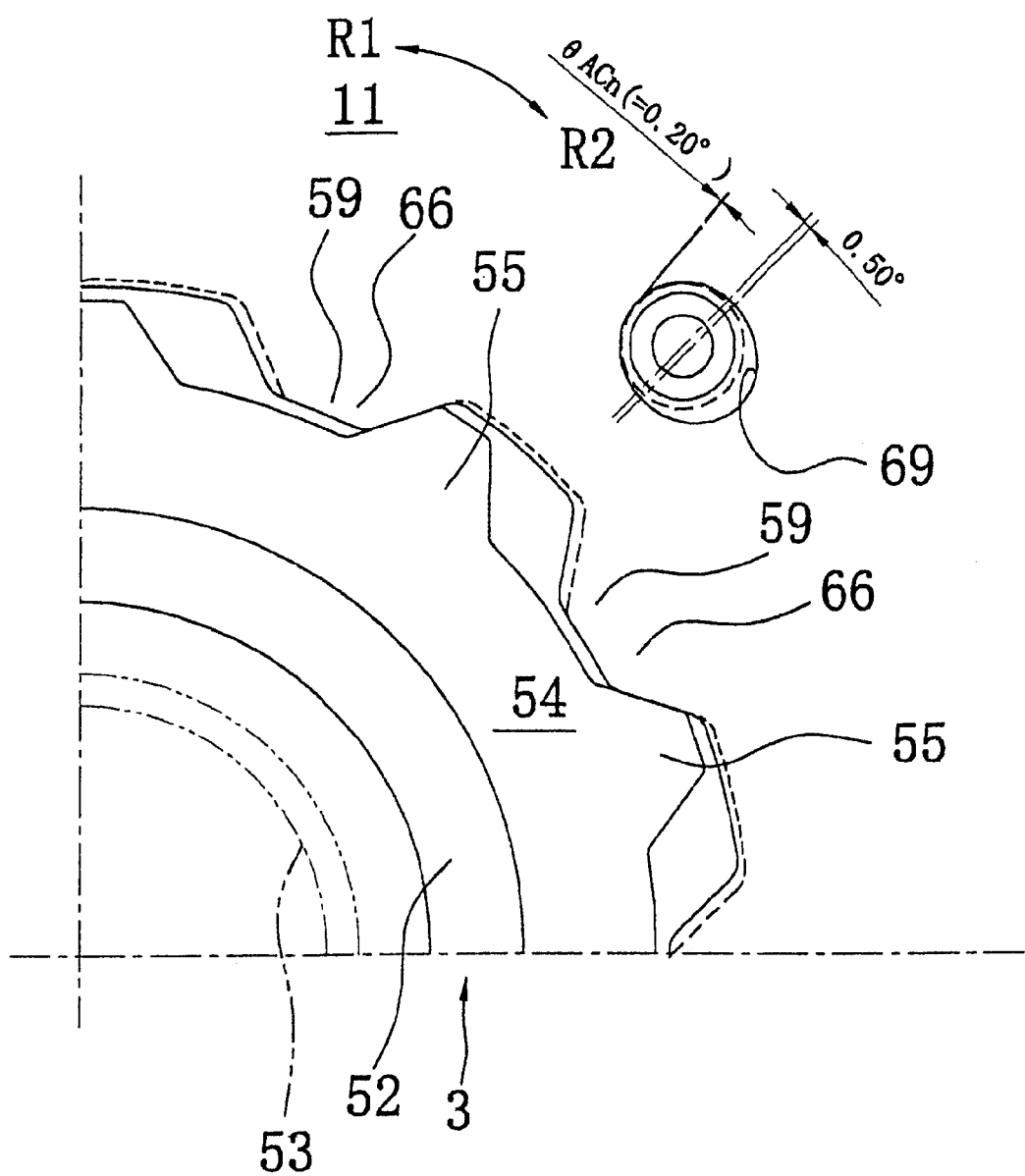
FIG. 9 is a fragmentary cutaway end view similar to FIGS. 7 and 8 showing the plates of the clutch disk assembly rotated in an R2 direction with respect to a hub of the clutch disk assembly.

The positive and negative second space angles θACp and θACn are further described in greater detail. The angle θACp is formed between the R2 side of the pin 62 and the R2 side of the aperture 69, as shown in FIG. 8. The angle θACn is formed between the R1 side of the pin 62 and the R1 side of the aperture 69, as shown in FIG. 9. In the structure described above, the angles θACp and θACn are provided independently of each other. This structure is different from the conventional structure, in which the single space is used for both the positive and negative second stages. Accordingly, the angle θACp can be different from the angle θACn. Therefore, each of the angles θACp and θACn can be set to an appropriate value.

In the depicted embodiment, the angle θACn is smaller than the angle θACp, and more specifically is substantially equal to half the angle θACp. Therefore, the angle θACp can be ensured to provide sufficiently a low hysteresis torque region for damping minute vibrations caused by variations in combustion of the engine during the normal driving. The angle θACn can be small in contrast to the angle θACp. Therefore, high hysteresis torque can be sufficiently generated on the opposite sides of the resonance frequency during deceleration. As a result, it is possible to reduce the peak of vibrations at the resonance frequency during deceleration.

The angle θACn can be extremely small, and can be substantially or completely equal to zero. In this case, the vibration level at the resonance frequency during deceleration can be extremely reduced. Conversely, the angle θACn can be larger than the angle θACp in some cases. This relationship is employed when such a situation is desired that the angle θACn is increased for damping the engine torque variations during the negative operation, and the angle θACp is reduced for facilitating generation of the high hysteresis torque on the opposite sides of the resonance frequency during acceleration in the positive operation.

The specific structure that makes possible the angles θACn and θACp is described below. As already described, θACp is equal to (θ3p-(θ1p-θ2p)), and θACn is equal to (θ3n-(θ1n-θ2n)). Since (θ1p-θ2p) is equal to (θ1n-θ2n), the difference between θACp and θACn is provided by the difference between θ3p and θ3n. Further, the difference between θ3p and θ3n is specifically caused by the pin 62 having a central position shifted toward the R2 side with respect to the aperture 69. By changing the relationship between the pin 62 and the aperture 69, the difference between θACp and θACn can be easily modified.

Since the angles θACp and θACn are defined between the pin 62 forming the axially extended coupling member and the aperture 69 in the separated flange 6, these can be kept with high accuracy. As a result, the minute angle smaller than one degree can be achieved. The aperture 69 may have an elongated recess-like shape having an open portion or other desired configuration, such as the oval or round shape shown in FIGS. 7, 8 and 9.

The invention relates at least in part to a structure in which the angles θACp and θACn are provided between the intermediate plate 11 and the second spring 8.

The sum of the positive and negative second space angles θ2p and θ2n forms the first space angle θAC provided for stopping the operation of the large friction mechanism 13 when the minute torsional vibrations are supplied in the positive and negative rotation directions of the second stages of the torsion characteristics. In this embodiment, the second space angle θAC is equal to 9 degrees. The second space angle θAC is preferably larger than the positive second space angle θACp and the negative second space angle θACn, and is preferably two times or more larger than each of them. The second space angle θAC can be ten through twenty times larger than the positive or negative second space angle.

As shown in FIG. 10, the small friction mechanism 15 is arranged between the input and output rotary members 2 and 3. The small friction mechanism 15 operates to generate slide whenever relative rotation occurs between the input and output rotary members 2 and 3 (in both first and second stages of relative rotary displacement). In this embodiment, the small friction mechanism 15 is basically formed of the second and third friction washers 79 and 85, but may alternatively be formed of members other than the above. In some cases, it is desirable that the hysteresis torque generated by the small friction mechanism 15 be as small as possible.

The operations of the damper mechanism in the clutch disk assembly 1 are described below in greater detail with reference to mechanical circuit diagrams. FIGS. 10 to 19 show operations of the respective parts and relationships between them in the state where the output rotary member 3 is rotated toward the R2 side with respect to the input rotary member 2. FIGS. 20 to 31 show the operations of the respective parts and the relationships between them in the state where the output rotary member 3 is rotated toward the R1 side with respect to the input rotary member 2.

FIGS. 10 and 20 show the neutral state of the clutch disk assemble 1. FIG. 7 shows the actual space angles θ1, θ2 and θ3 between the output rotary member 3, intermediate plate 11 and separated flange 6 in neutral state (a torsion free state).

The output rotary member 3 in the neutral position shown in FIG. 10 may be rotated or twisted toward the R2 side with respect to the output rotary member 3. In this operation, the input rotary member 2 is relatively twisted toward the R1 side, i.e., the drive side in the rotating direction with respect to the output rotary member 3. When output rotary member 3 rotates 3 degrees toward the R2 side from the position shown in FIG. 10, it enters the state shown in FIG. 11. As a result of the 3 degrees of rotation, the first springs 7 are compressed in the rotating direction between the output rotary member 3 and the separated flange 6 so that sliding occurs in the small friction mechanism 15. This results in characteristics of a low rigidity and a low hysteresis torque. The space angle of each of the first and third stops 9 and 12 as depicted in FIG. 11 is reduced by 3 degrees from the state depicted in FIG. 10.

Figure 11:
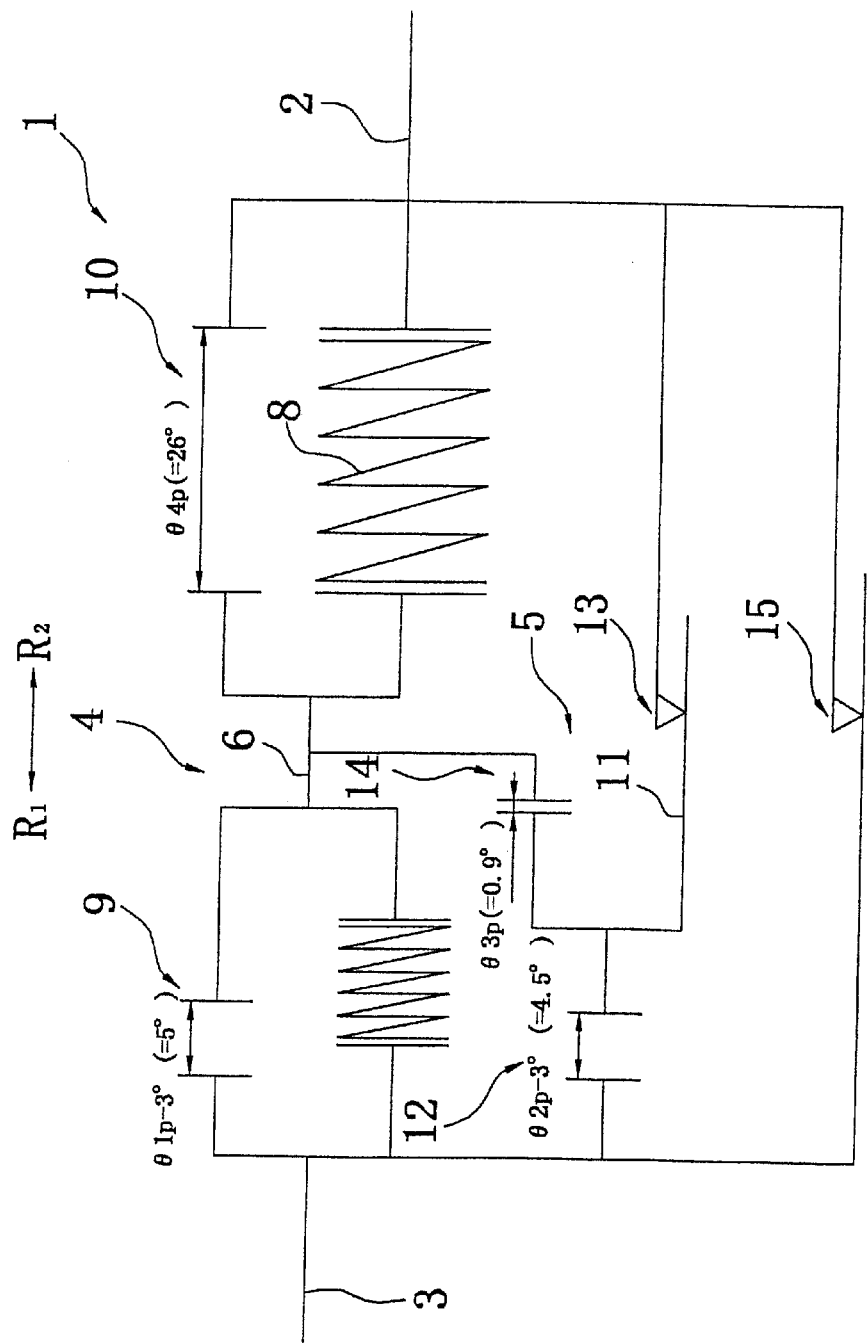
FIGS. 11 through 31 are further mechanical circuit diagram schematically showing operable relationships between the various portions of the damper mechanism in various stages of relative rotary displacement in response to transmission of torque and vibrations; echanical circuit diagram showing the damper mechanism in the clutch disk assembly.
Figure 12:
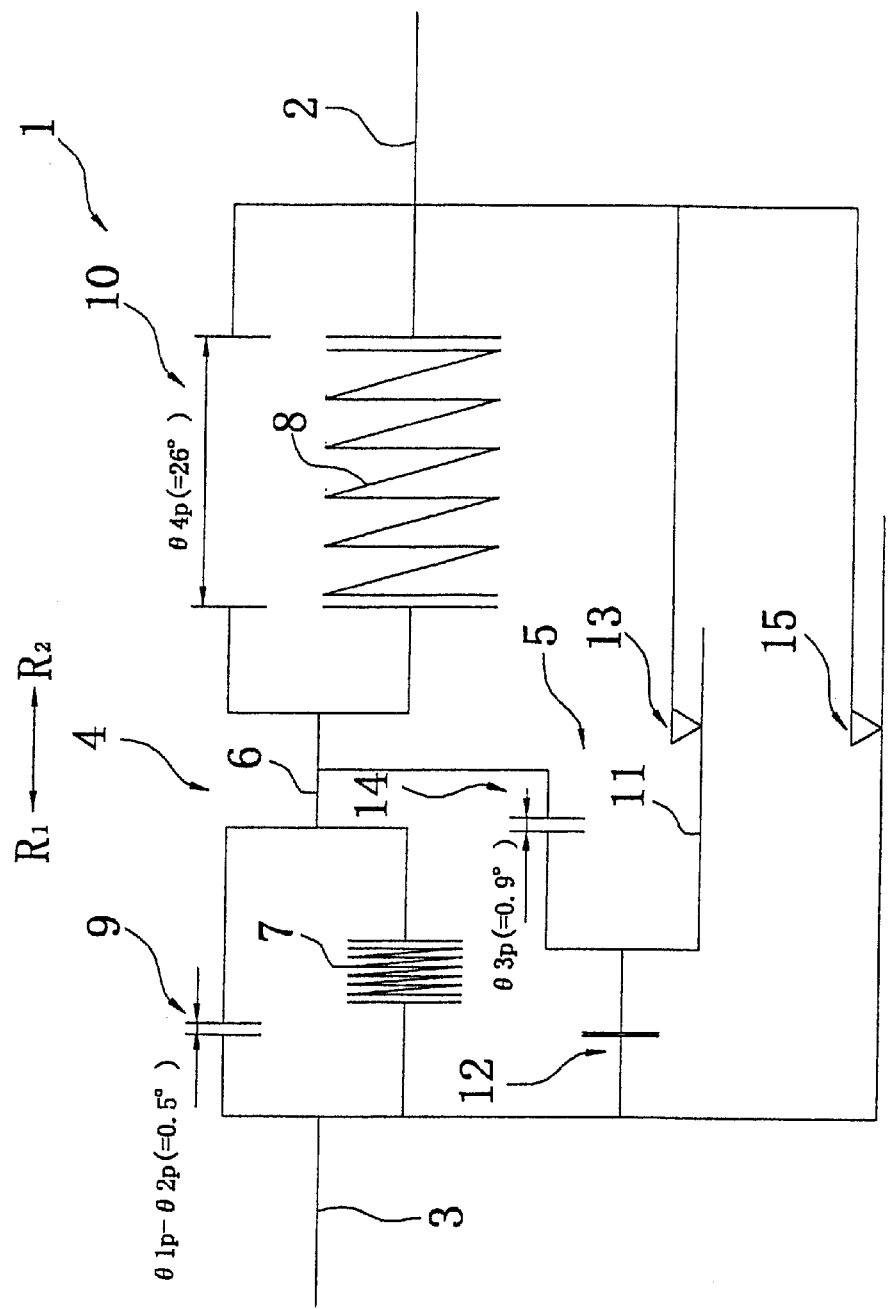

When the output rotary member 3 further rotates 4.5 degrees from the position in FIG. 11, it enters the state shown in FIG. 12. As a result of the further rotation, the first springs 7 are likewise compressed in the rotating direction between the output rotary member 3 and the separated flange 6 so that sliding occurs in the small friction mechanism 15.

In FIG. 12, the output rotary member 3 and the intermediate plate 11 in the third stop 12 come into contact with each other, and the space angle equal to the difference between the first space angle θ1p of the first stop 9 and the second space angle θ2p of the third stop 12 is kept in the first stop 9.

Figure 13:
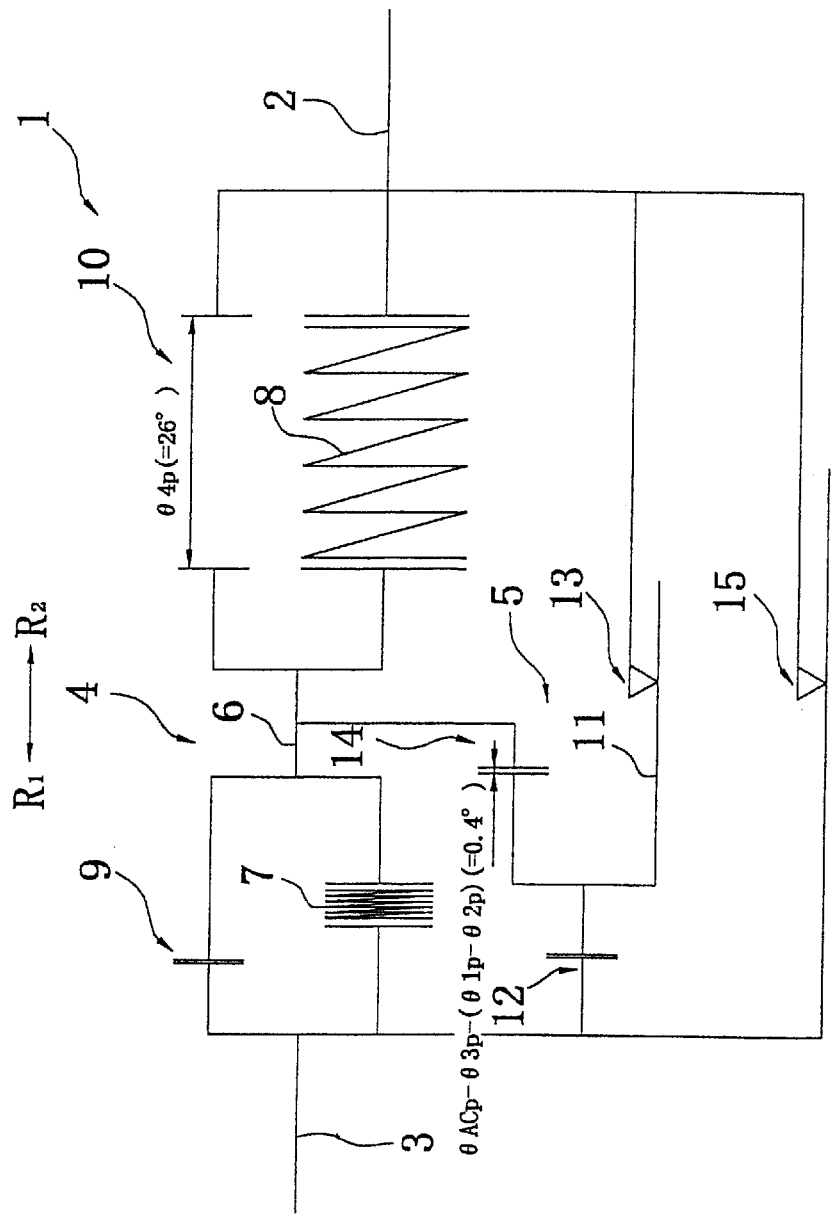

When the output rotary member 3 twists 0.5 degrees from the position in FIG. 12, it enters the state shown in FIG. 13. As a result of the rotation, sliding and thus high hysteresis torque occur in the large friction mechanism 13 (sliding also occurs in the small friction mechanism 15). Therefore, a region causing a high rigidity and a high hysteresis torque is formed at an end of the region of the low rigidity and a low hysteresis torque. In FIG. 13, the output rotary member 3 and the separated flange 6 in the first stop 9 are in contact with each other, and the positive second space angle θACp (0.4 degrees), which is equal to the value obtained by subtracting the difference between the first and second space angles 1p and 2p from the third space angle θ3p, is established in the fourth stop 14.

As shown in FIG. 13, the first stop 9 is in a contact state, and therefore the first springs 7 are not able to undergo further compression. When the output rotary member 3 twists toward the R2 side from the position shown in FIG. 13, it enters the state shown in FIG. 14. As a result, the separated flange 6 cooperates with the input rotary member 2 to compress the second springs 8. At this time, sliding occurs between the intermediate plate 11 and the input rotary member 2 so that friction occurs in the large friction mechanism 13 (sliding also occurs in the small friction mechanism 15). As a result, characteristics of high rigidity and high hysteresis torque are produced. In this second stage of relative rotary displacement, the positive second space angle θACp is maintained between the intermediate plate 11 and the separated flange 6. When the structure in the state shown in FIG. 14 receives minute torsional vibrations, the compressed second springs 8 expand. In this operation, sliding does not occur in the large friction mechanism 13 when the operation is in a range defined by the positive second space angle θACp. Thus, the positive second space angle θACp functions as a friction suppressing mechanism, which stops sliding in the large friction mechanism 13 with respect to the minute torsion vibrations not exceeding the predetermined torque, and thus causing a small torsion angle in the positive second stage of the torsion characteristics. The depiction in FIG. 8 corresponds to the mechanical circuit diagrams of FIGS. 13 and 14.

Figure 21:
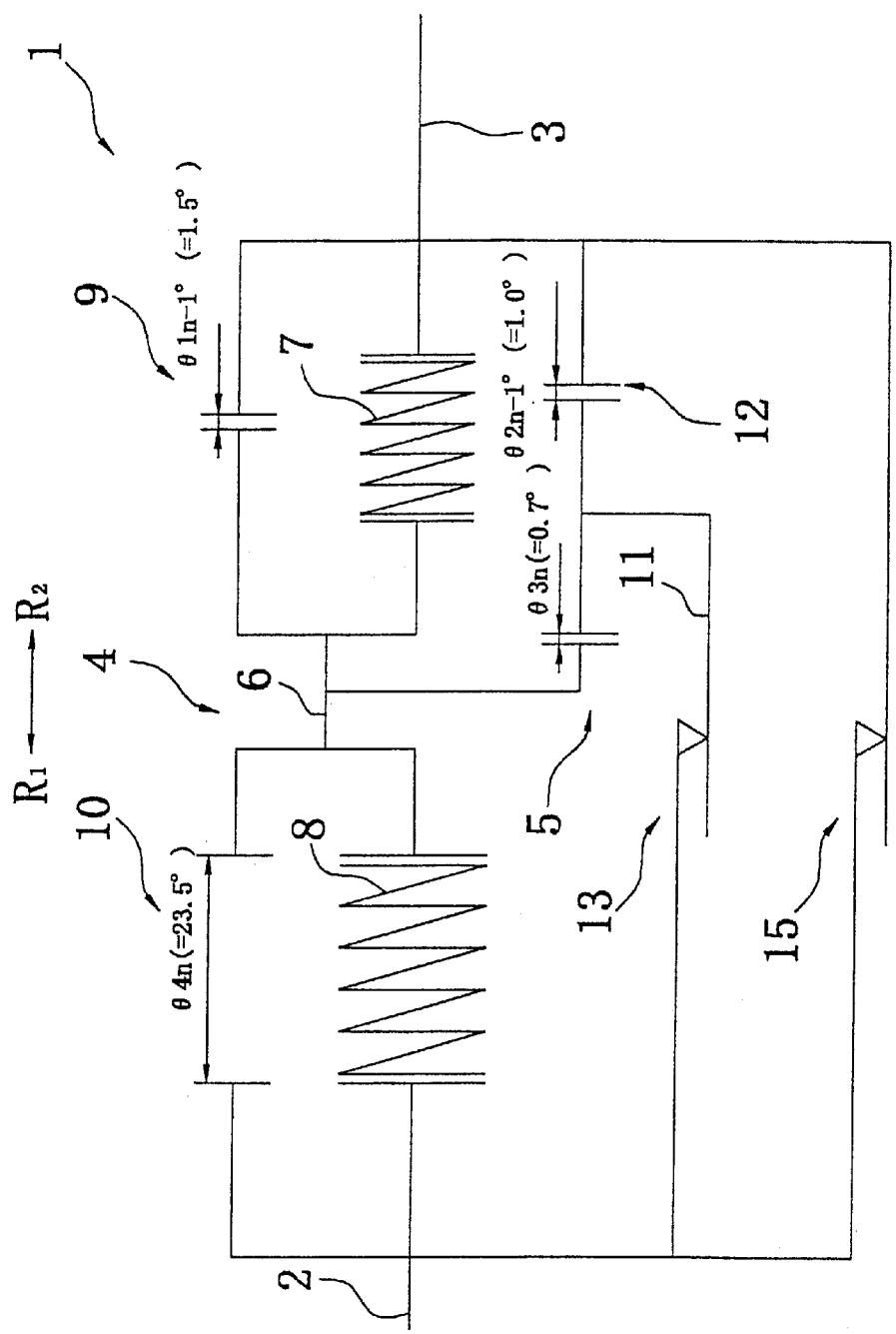

Description is now provided for the operation in which the output rotary member 3 in the neutral position shown in FIG. 20 twists toward the R1 side with respect to the input rotary member 2. In this operation, the input rotary member 2 twists with respect to the output rotary member 3 toward the R2 side opposite to the drive side in the rotating direction. When the output rotary member 3 in the state shown in FIG. 20 twists 1 degree toward the R1 side with respect to the input rotary member 2, it enters the state shown in FIG. 21. In this operation, the first springs 7 are compressed between the output rotary member 3 and the separated flange 6, and sliding occurs in the small friction mechanism 15. This results in the characteristics of a low rigidity and a low hysteresis torque. In FIG. 21, the space angle of each of the first and third stops 9 and 12 is reduced by 1 degree. When the output rotary member 3 in the state shown in FIG. 21 twists 1 degree toward the R1 side with respect to the input rotary member 2, it enters the state shown in FIG. 22. In this operation, the first springs 9 are likewise compressed between the output rotary member 3 and the separated flange 6, and sliding occurs in the small friction mechanism 15.

Figure 22:
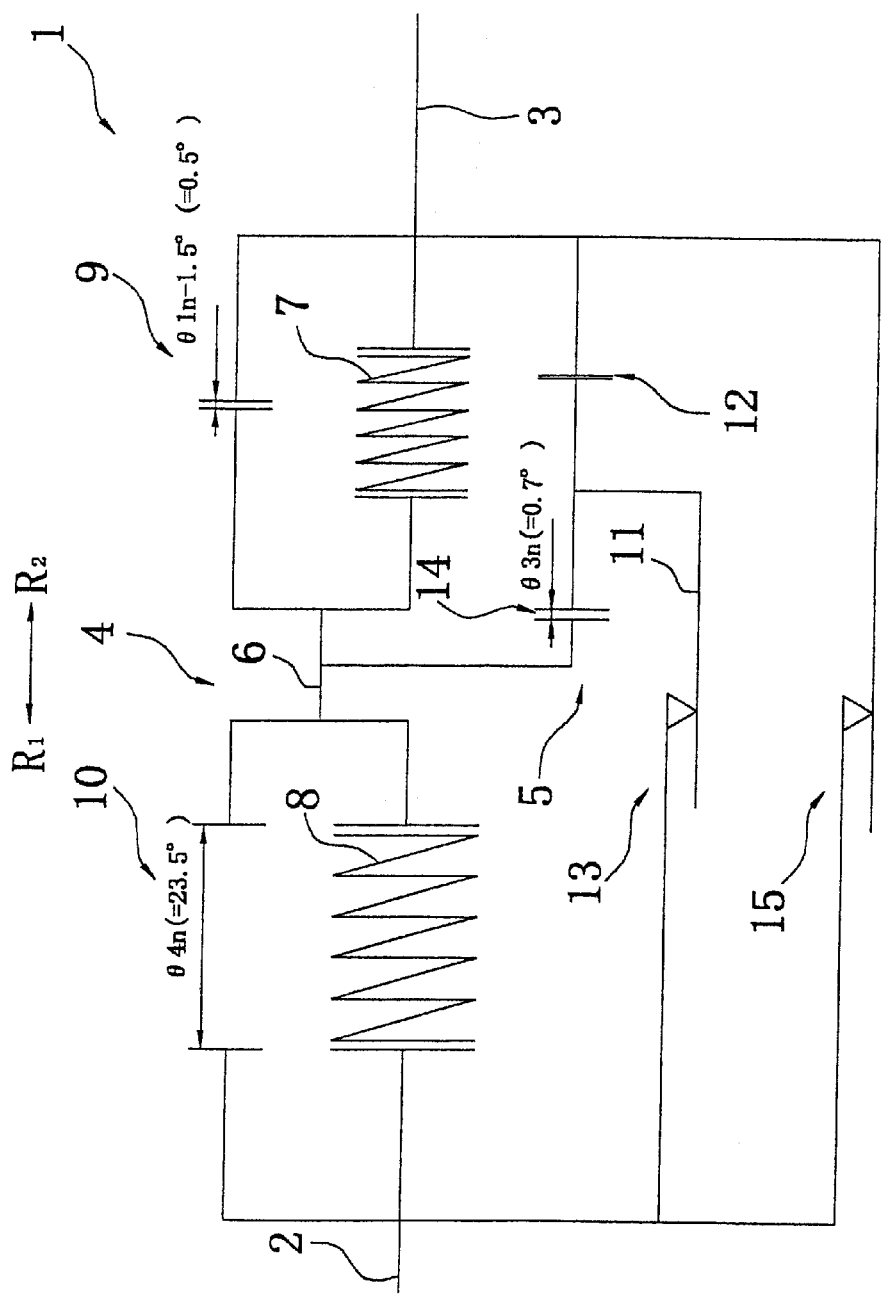
Figure 23:
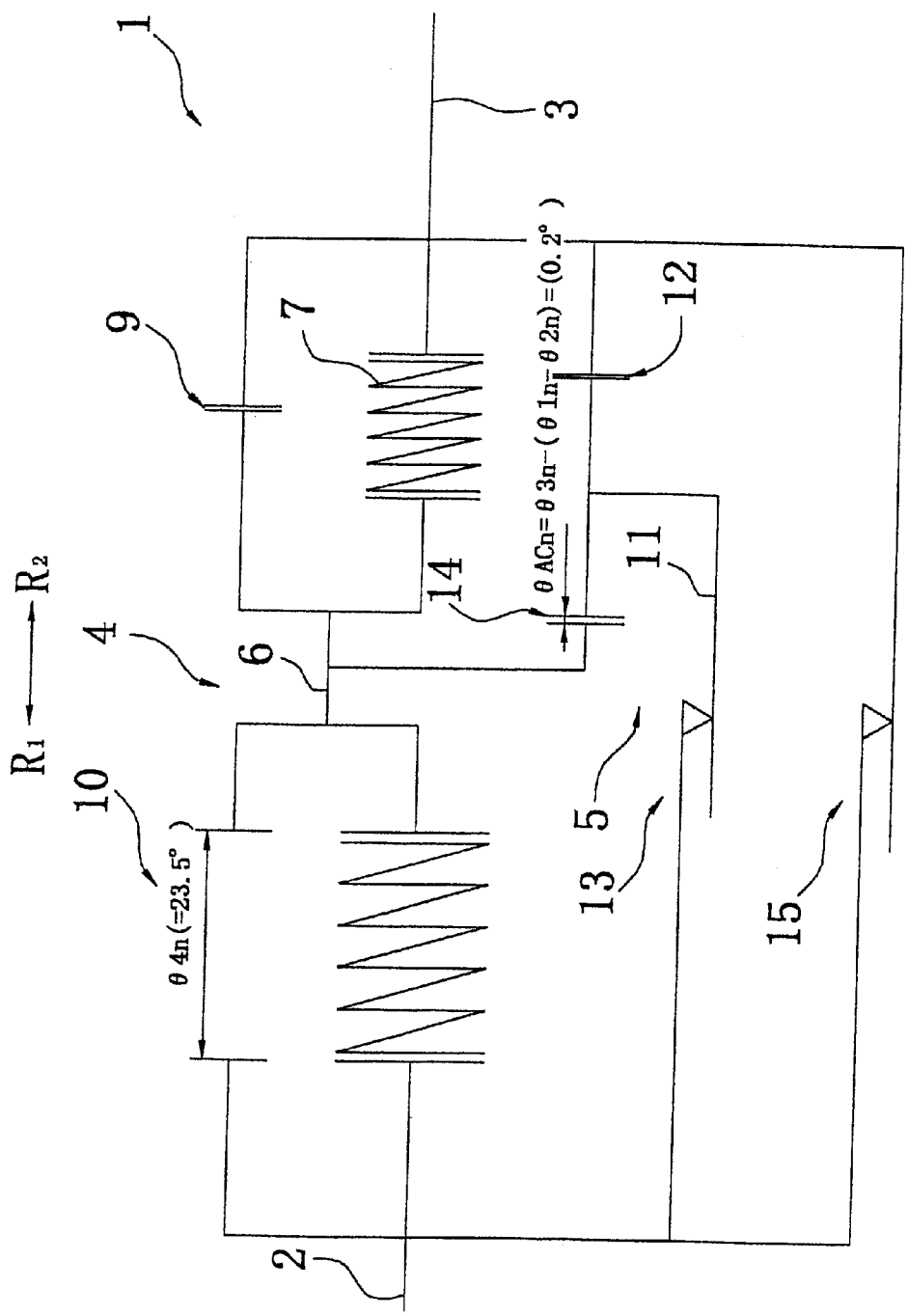

In FIG. 22, the output rotary member 3 and the intermediate plate 11 in the third stop 12 are in contact with each other. When the output rotary member 3 in the state shown in FIG. 22 twists 0.5 degrees toward the R1 side with respect to the input rotary member 2, it enters the state shown in FIG. 23. In this operation, sliding occurs in the large friction mechanism 13, and a high hysteresis torque occurs (sliding also occurs in the small friction mechanism 15). Therefore, a region of a low rigidity and a high hysteresis torque is formed in the end of the region of the low rigidity and the low hysteresis torque. In FIG. 23, the output rotary member 3 and the separated flange 6 in the first stop 9 are in contact with each other. Therefore, the first springs 7 may not undergo any further compression.

In the state shown in FIG. 23, the fourth stop 14 has the negative second space angle θACn of a value (0.2 degrees) which can be obtained by subtracting a difference between the first and second space angles 1n and 2n from the third space angle θ3n. In this operation, the second springs 8 are compressed in the rotating direction, and sliding occurs in the large friction mechanism 13 at the same time (sliding also occurs in the small friction mechanism 15). This results in characteristics of a high rigidity and a high hysteresis torque. In the state shown in FIG. 24, the negative second space angle θACn is likewise ensured in the fourth stop 14. When minute torsional vibrations are supplied in the state shown in FIG. 24, the second springs 8 in the compressed state repeat the expansion and compression. In this operation, no sliding occurs in the large friction mechanism 13 when it operates in the range of the angle θACn. Thus, the negative second space angle θACn functions as a friction suppressing mechanism, which stops sliding in the large friction mechanism 13 with respect to the minute torsion vibrations in the negative second stage of the torsion characteristics.

Figure 24:
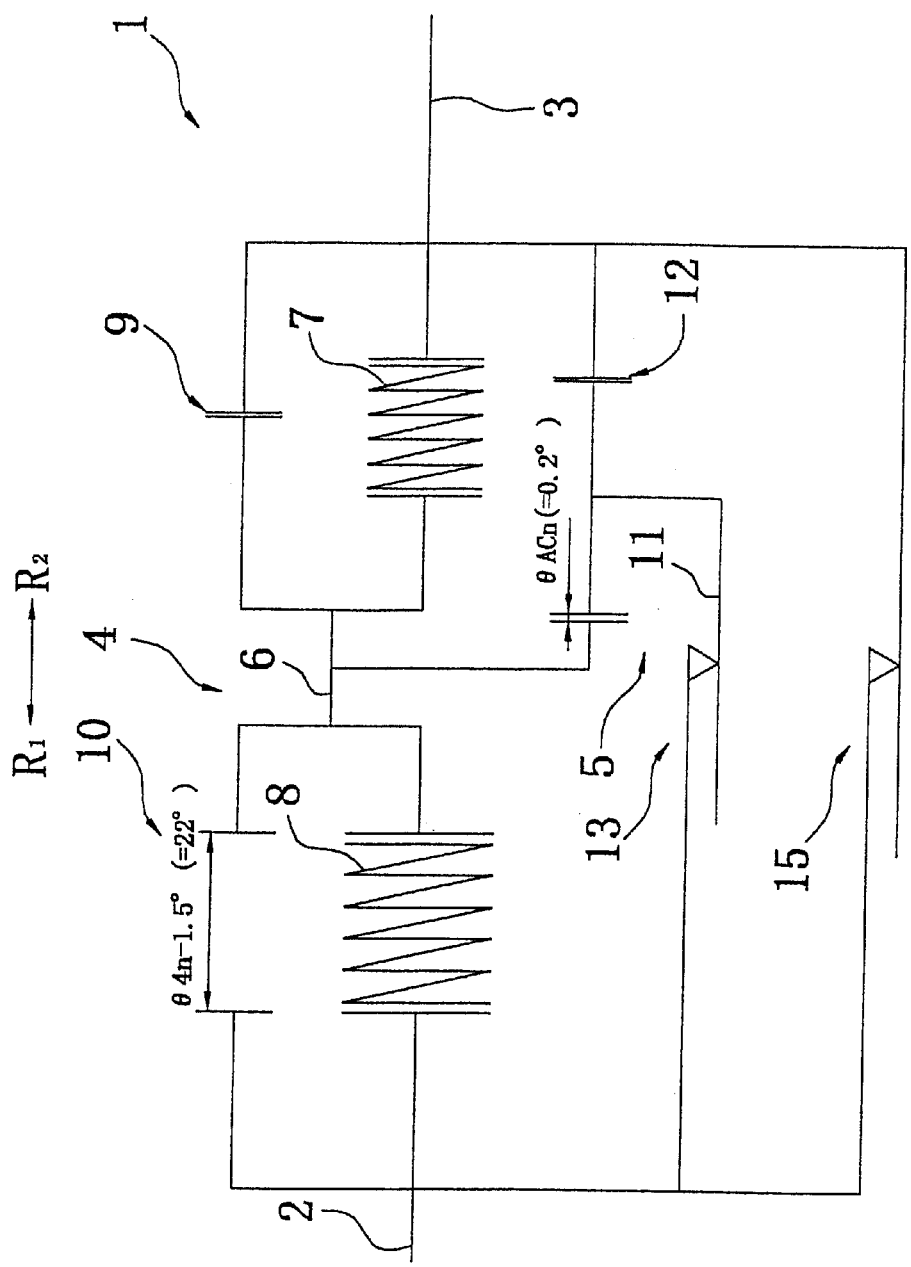

FIG. 9 depicts the portions of the clutch disk assembly in the state represented in the mechanical circuit diagrams of FIGS. 23 and 24.

Figure 32:
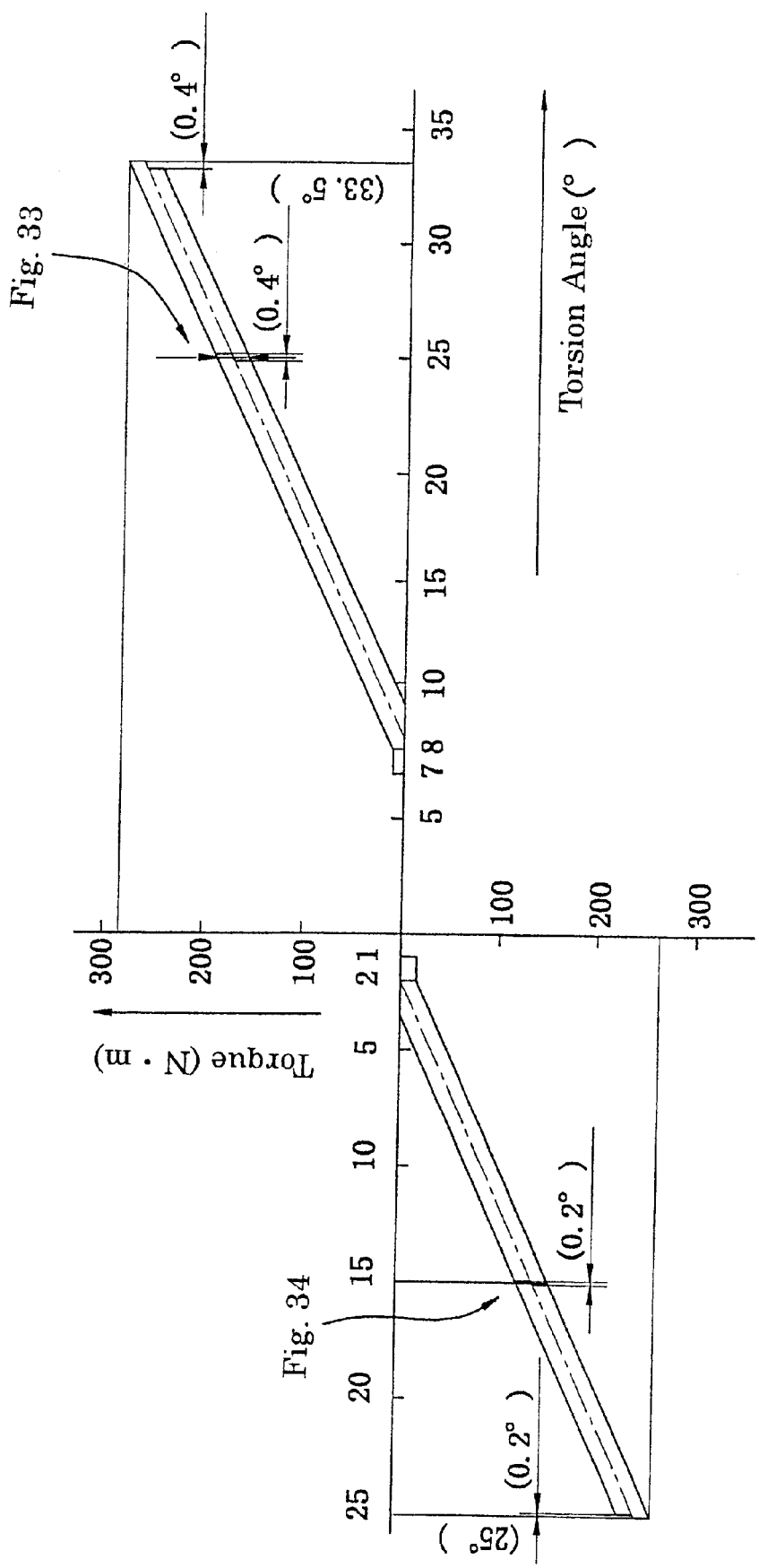
FIG. 32 is a graph of torque-displacement responses representing torsion characteristics of the damper mechanism depicted in FIGS. 1–31.
Figure 33:
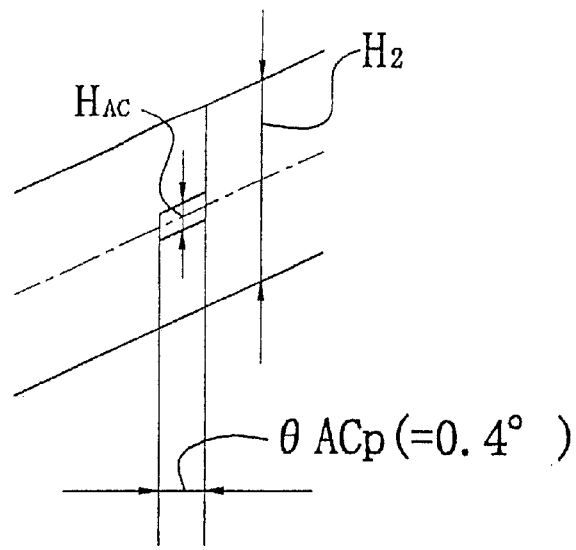
FIGS. 33 and 34 are further graphs showing, on an enlarged scale, portions of the torsion characteristics depicted in FIG. 32 on an enlarged scale.
Figure 34:
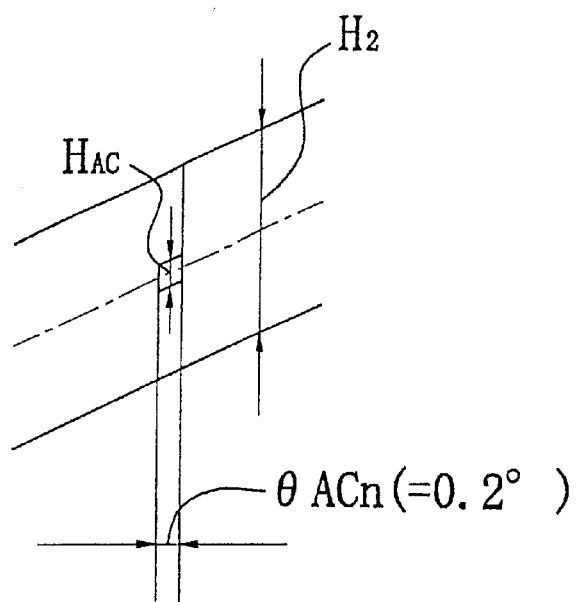

The operation of the clutch disk assembly is described below with reference to FIGS. 32, 33 and 34. FIG. 32 is a graph showing the vibration dampening characteristics of the clutch disk assembly of the present invention in terms of degrees of torsion angle displacement on the x-axis and torque on the y-axis, indicating changes in rigidity and hysteresis torque which occur between a maximum positive displacement angle and a negative maximum displacement angle. FIG. 33 is an enlarged portion of FIG. 32 showing the space angle θACp where the friction generating mechanism 11 is not operational so that the springs 8 can absorb small variations or vibrations. FIG. 34 is another enlarged portion of FIG. 32 showing the space angle θACn where the friction generating mechanism 11 is not operational so that the springs 8 can absorb small variations or vibrations. FIG. 33 is explained first and FIG. 34 is explained later below.

Figure 14:
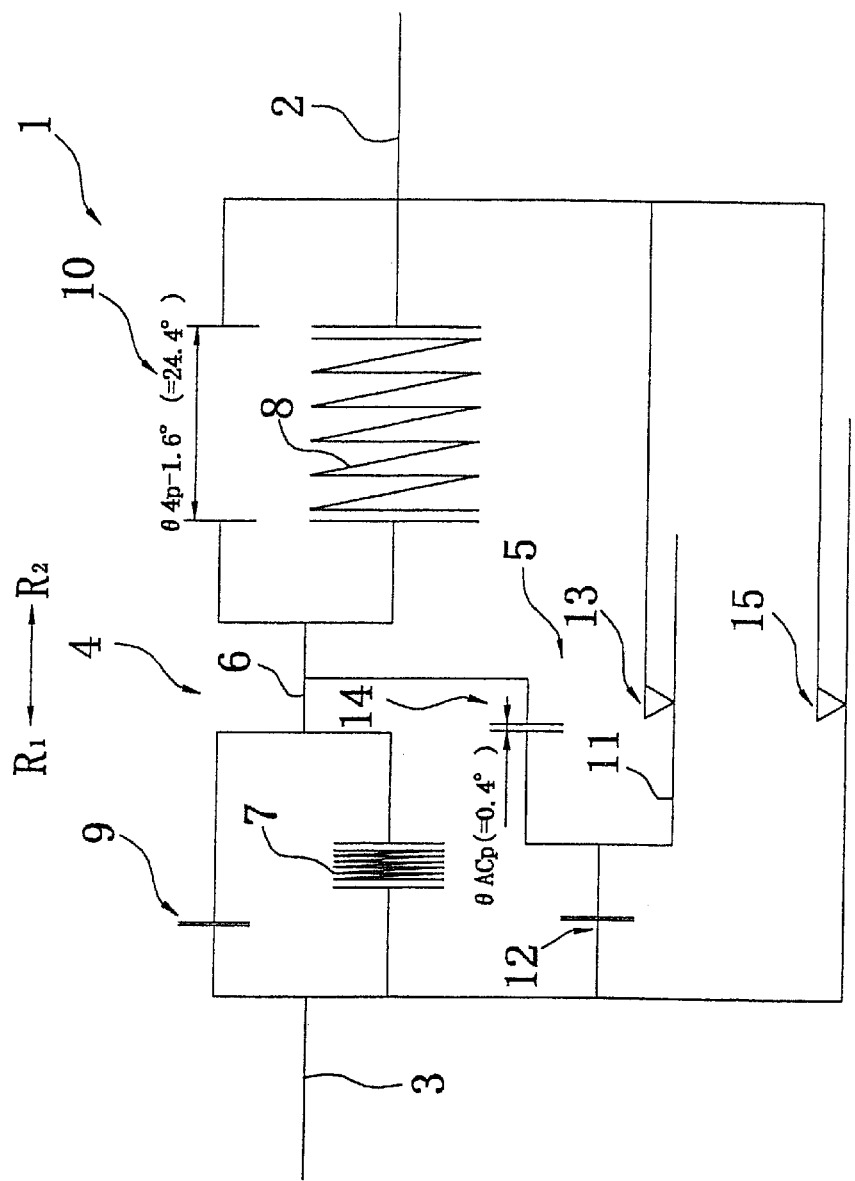

First, description is given on operations as the output rotary member 3 returns to the initial state (torsion free state) from the state where it is in the position rotated toward the R2 side and therefore negative side with respect to the input rotary member 2, and thereby the compressed second springs 8 as shown in FIG. 14 expand to return towards an uncompressed state. When the second springs 8 in the state shown in FIG. 14 expand, they push the separated flange 6 and the output rotary member 3 toward the R1 side so that the mechanism enters the state shown in FIG. 15. During the transition between the state in FIG. 14 to the state in FIG. 15, no sliding occurs in the large friction mechanism 13, and therefore the high hysteresis torque does not occur in the range of the positive second space angle θACp as the separated flange 6 and the intermediate plate 11 in the fourth stop 14 move toward one another and eventually contact one another. It should be understood from the above, that the second springs 8 operate to cause sliding in the small friction mechanism 15, but no sliding occurs in the large friction mechanism 13 as the output rotary member 3 rotates with respect to the input rotary member 2 between the states shown in FIGS. 14 and 15. Therefore, the characteristics of a high rigidity and a low hysteresis torque can be produced in a range of relative rotary displacement in the second stage and further within the limited positive second space angle θACp.

A hysteresis torque HAC and hysteresis torque H2 are depicted in FIG. 33. Hysteresis torque HAC represents the low hysteresis torque generated by the small friction mechanism 15 as the large friction mechanism 13 does not operate within the angular range θACp within the second stage of relative rotary displacement within the clutch disk assembly. The hysteresis torque H2 represents hysteresis torque generated when both the large and small friction mechanisms 13 and 15 operate within the second stage of relative rotary displacement. As is clear from FIG. 33, with a positive displacement angle, the hysteresis torque H2 is significantly greater than the hysteresis torque HAV. With the large friction mechanism 13 not operating within the space angle θACp, minute vibrations within the second stage of relative rotary displacement are easily absorbed or dampened. Owing to the above characteristics, the minute torsional vibrations not exceeding the predetermined torque and therefore having a small torsion angle (amplitude) can be effectively absorbed and damped.

The positive second space angle θACp is small enough to ensure generation of the hysteresis torque H2 on the opposite sides of a resonance frequency during acceleration.

Figure 15:
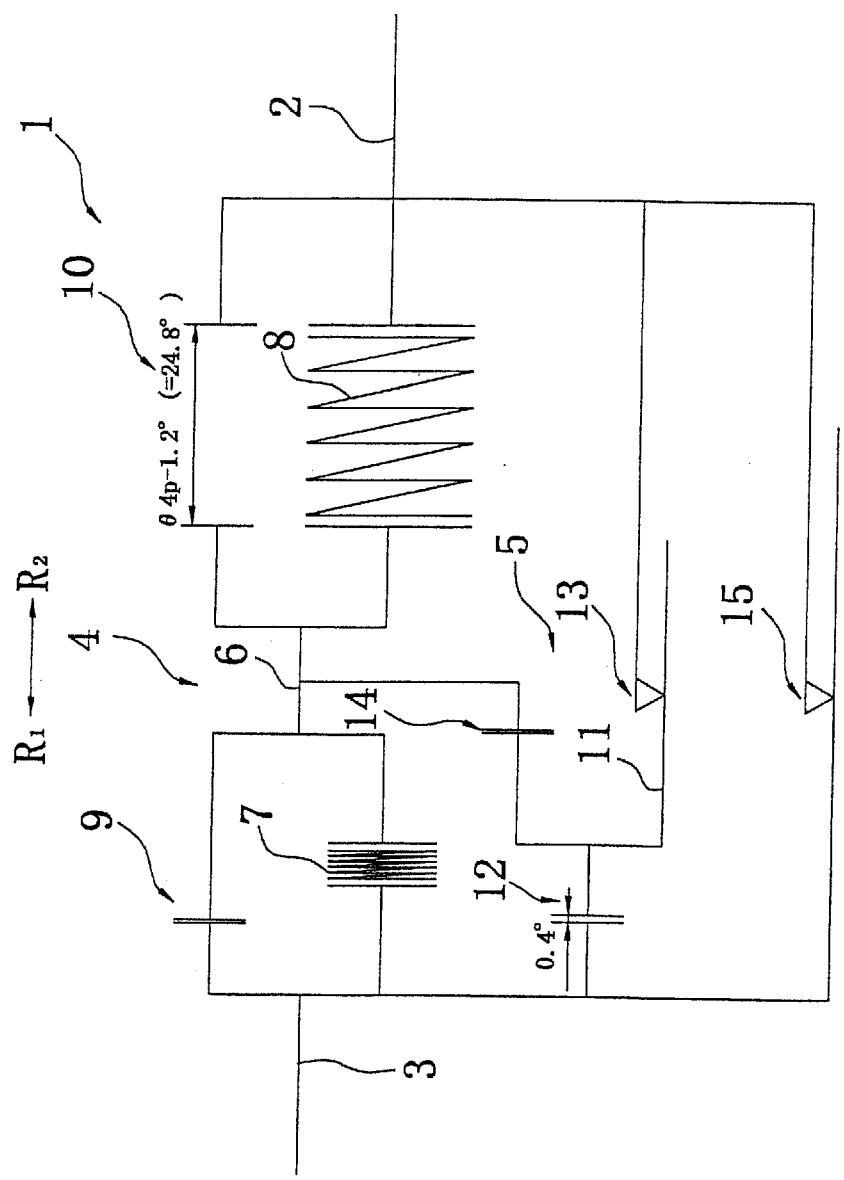
Figure 16:
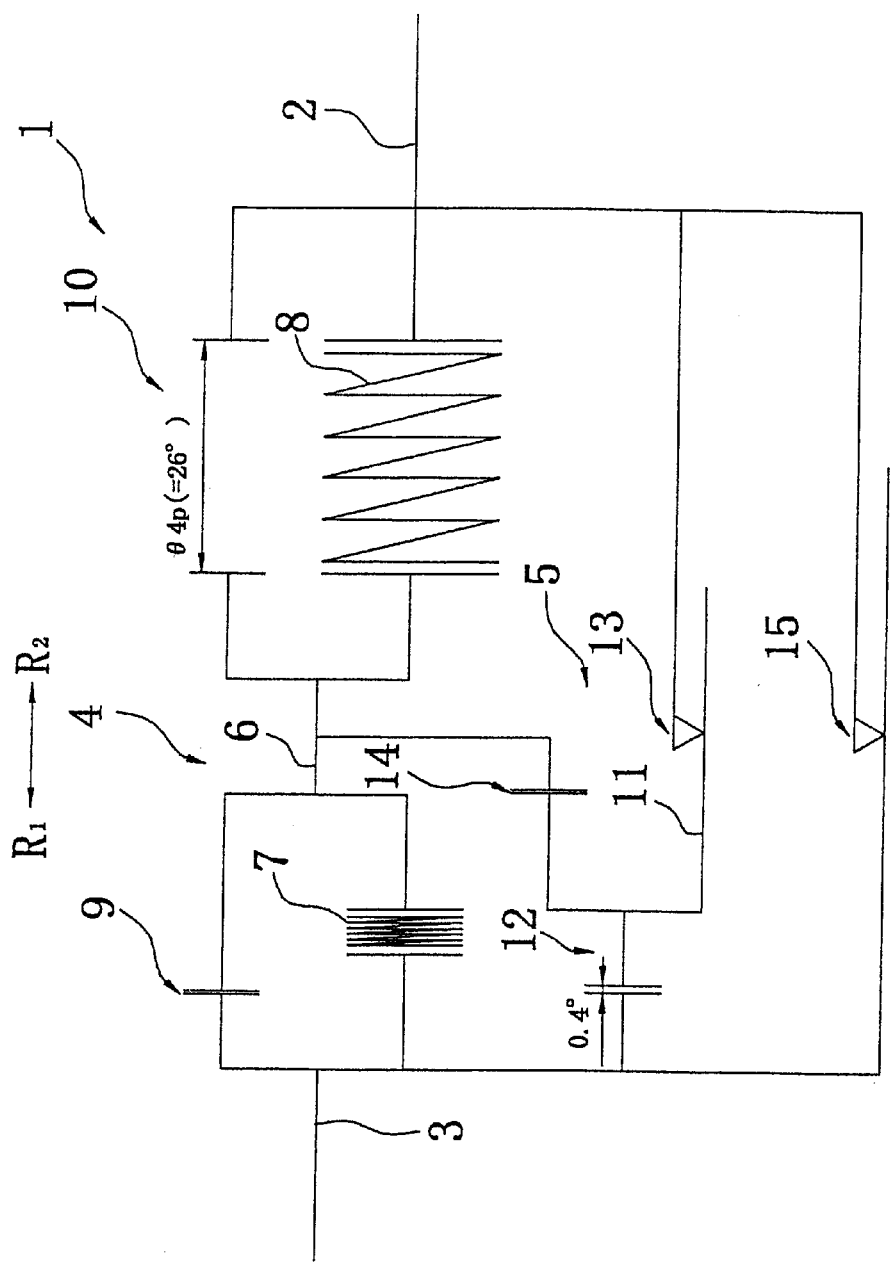
Figure 17:
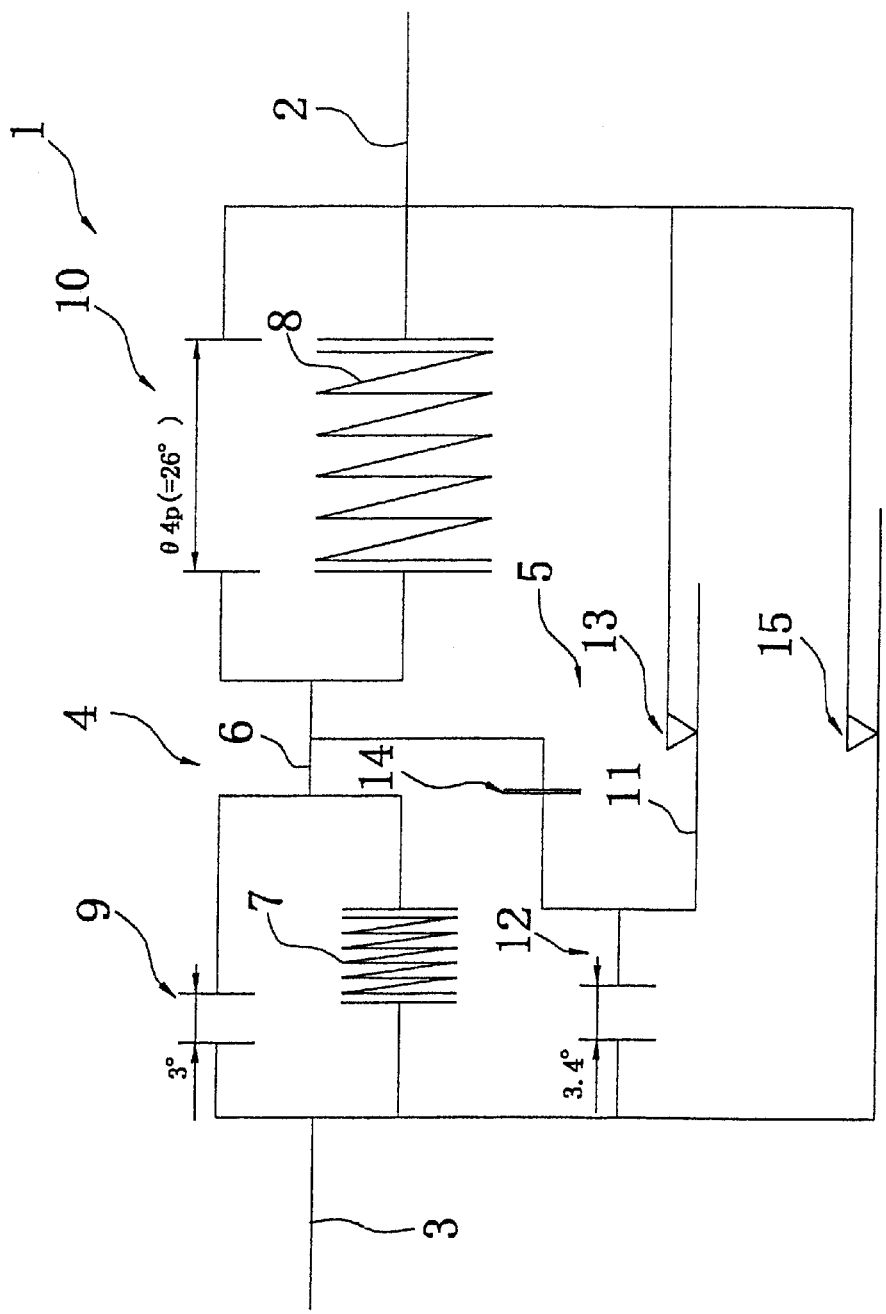

When the second springs 8 as shown in FIG. 15 expand 1.2 degrees, they enter the state shown in FIG. 16. In the transition therebetween, sliding occurs in the large friction mechanism 13 so that a large hysteresis torque occurs. In FIG. 16, the second springs 8 are fully expanded and are not able to expand further. A space of 0.4 degrees is formed in the third stop 12. When the first springs 7 in the state shown in FIG. 16 expand, they push the output rotary member 3 toward the R1 side so that the mechanism enters the state shown in FIG. 17. In the transition between the states in FIGS. 16 and 17, the space angle in each of the first and third stops 9 and 12 increases. As the first springs 7 further expand from the state depicted in FIG. 17 to the state depicted in FIG. 18, the first springs 7 expand to their maximum extent, and space angle θ1p of 8 degrees is established in the first stop 9. The state depicted in FIG. 18 corresponds to a torsion angle of 0 degrees in the torsion characteristic diagram FIG. 32.

Figure 18:
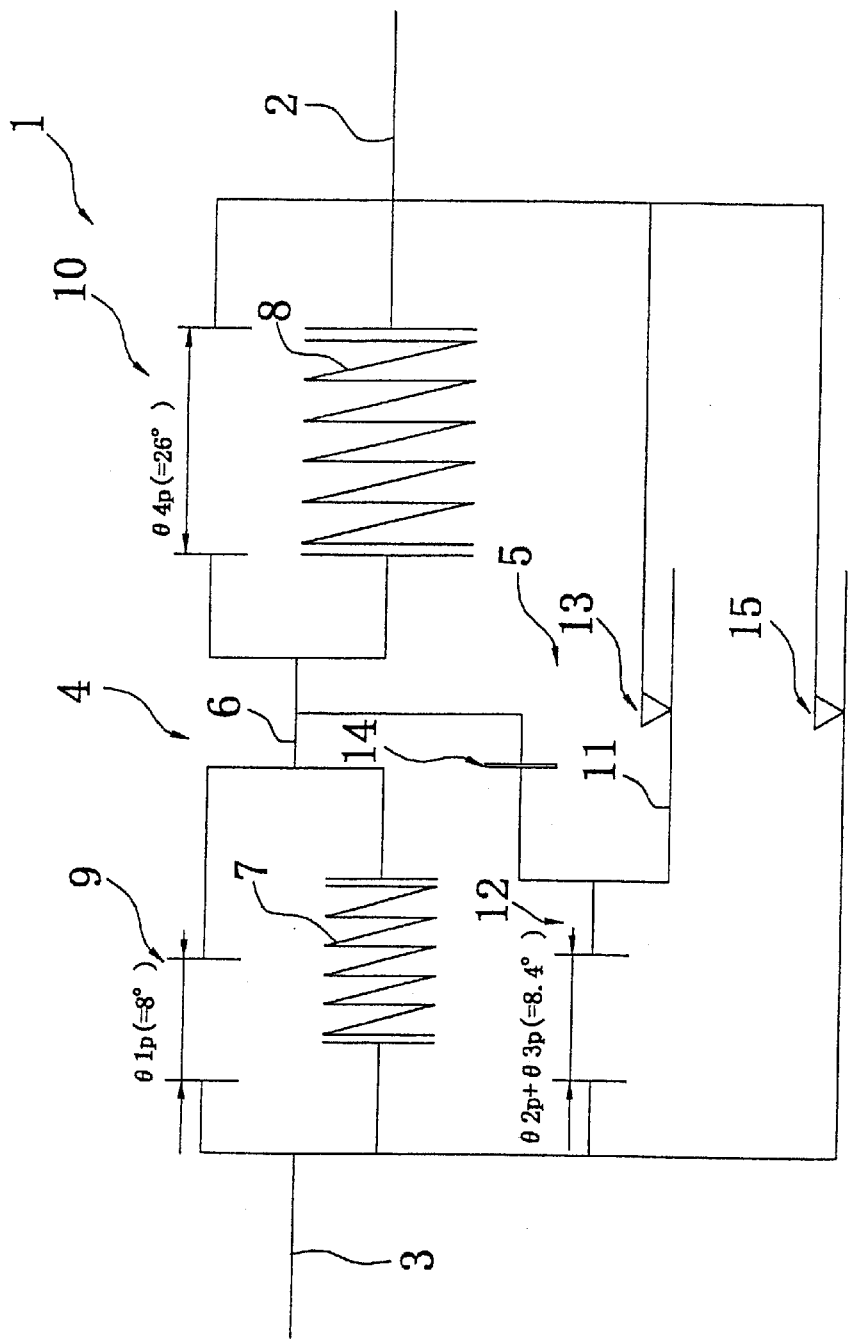

A comparison between FIGS. 18 and 10 reveals that the position of the intermediate plate 11 in FIG. 18 is rotated by the first space angle θ3p (0.9 degrees) toward R2 side so that the space angle of the third stop 12 is 8.4 degrees (θ2p+θ3p=8.4 deg.) established in the third stop 12, while the intermediate plate 11 is in contact with the separated flange 6 in the fourth stop 14.

Figure 25:
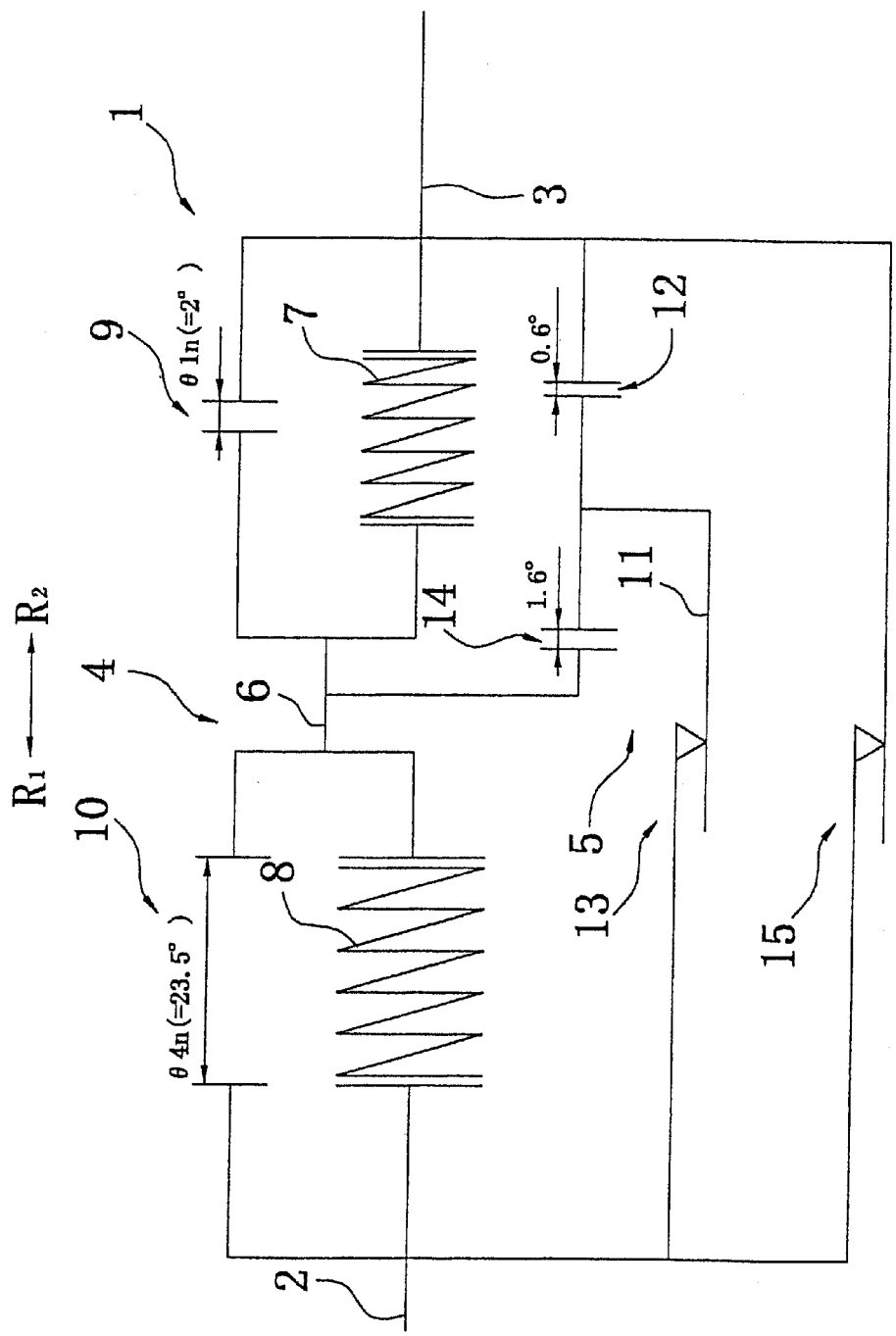

As was mentioned above, FIGS. 10–19 are schematic representations of the various portions of the clutch disk assembly undergoing relative rotary displacement in the positive rotation direction and, FIGS. 20–31 are schematic representation of the various portions of the clutch disk assembly undergoing relative rotary displacement in the negative rotation direction. The state in FIG. 18 showing displacement from a positive displacement perspective, corresponds to the state in FIG. 25, which shows displacement from a negative displacement perspective. In other words, the angular displacement of the various portions of the clutch disk assembly depicted in FIGS. 18 and 25 are the same, but are shown from different perspectives.

Figure 26:
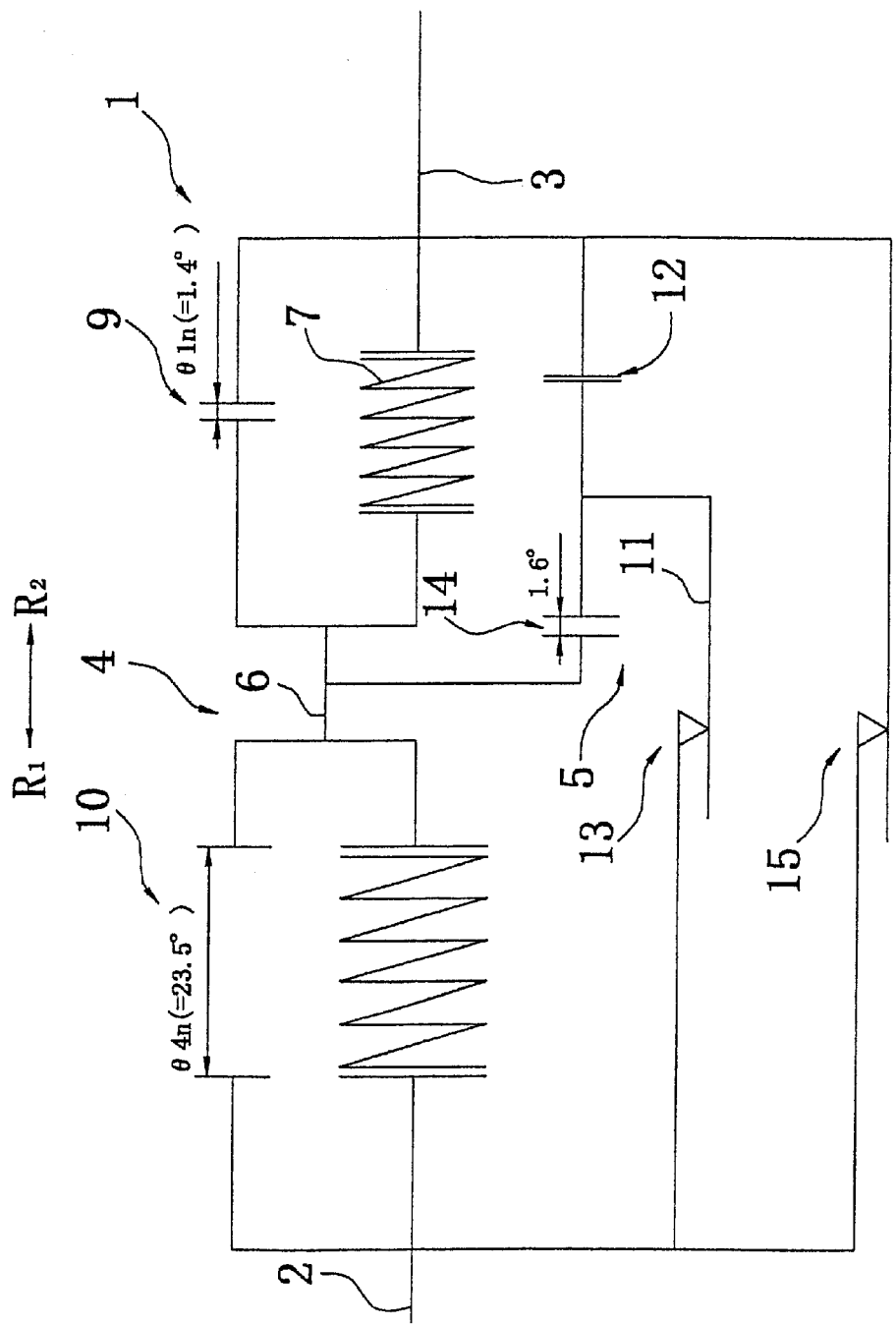

In FIG. 25, the intermediate plate 11 is in a position rotated by the first space angle θ3p (0.9 deg.) toward the R2 side from that in FIG. 20. When the output rotary member 3 in FIG. 25 twists 0.6 degrees toward the R1 side, it enters the state shown in FIG. 26. In this operation, the first springs 7 are compressed between the output rotary member 3 and the separated flange 6 so that sliding occurs in the small friction mechanism 15. This results in the characteristics of a low rigidity and a low hysteresis torque. In FIG. 26, the output rotary member 3 and the intermediate plate 11 in the third stop 12 are in contact with each other. When the output rotary member 3 in FIG. 26 further rotates toward the R1 side, it enters the state shown in FIG. 27. During this operation, sliding occurs in the large friction mechanism 13, and a high hysteresis torque occurs (sliding also occurs in the small friction mechanism 15). Therefore, a-region of a high rigidity and a high hysteresis torque is formed in the end of the region of a low rigidity and a low hysteresis torque.

Figure 27:
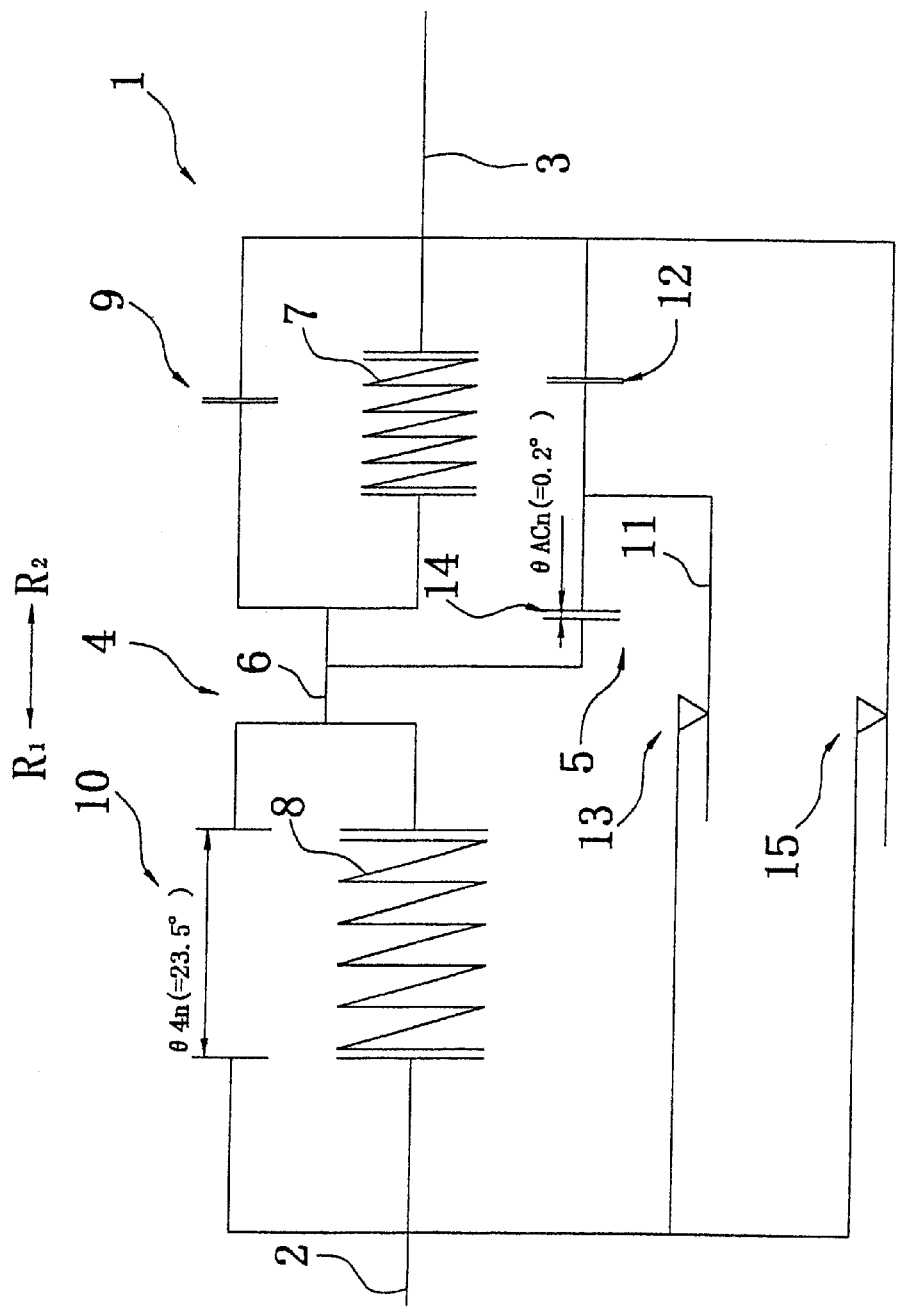

In FIG. 27, the output rotary member 3 and the separated flange 6 in the first stop 9 are in contact with each other. Therefore, the first springs 7 will be compressed no further. This region of the low rigidity and the high hysteresis torque starts at an angle preceding by θ3p (0.9 deg,) the start in the case of twisting from the neutral position because the position of the intermediate plate 11 is shifted as described above. In the state shown in FIG. 27, the negative second space angle θACn of 0.2 degrees is formed in the fourth stop 14. When the output rotary member 3 in the state shown in FIG. 27 rotates toward the R1 side with respect to the input rotary member 2, it enters the state shown in FIG. 28. In this operation, the second springs 8 are compressed in the rotating direction, and sliding occurs in the large friction mechanism 13 (sliding also occurs in the small friction mechanism 15). This results in characteristics of a high rigidity and a high hysteresis torque. In the state shown in FIG. 28, the negative second space angle θACn is likewise ensured in the fourth stop 14.

Figure 28:
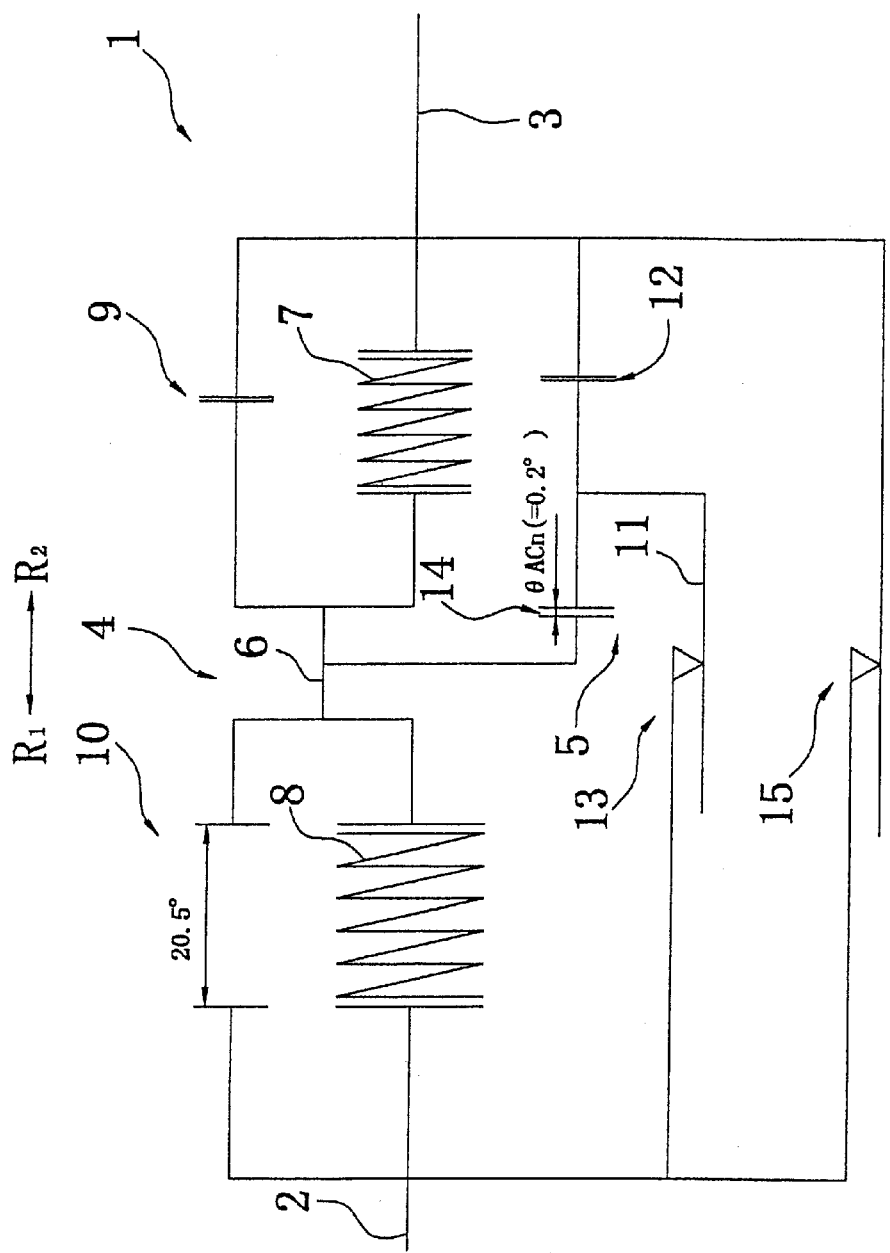

Now, description is given on the operation performed when the output rotary member 3 returns to the initial state (no torsion present) from the displaced state with rotation toward the R1 side and therefore positive side with respect to the input rotary member 2, with the second springs 8 compressed as shown in FIG. 28. When the second springs 8 in the state shown in FIG. 28 expand, they push the separated flange 6 and the output rotary member 3 toward the R2 side so that the mechanism enters the state shown in FIG. 29. In this operation, no sliding occurs in the large friction mechanism 13, and therefore the high hysteresis torque does not occur in the range of the angle θACp before the separated flange 6 and the intermediate plate 11 in the fourth stop 14 come into contact with each other. It can be understood from the above that the second springs 8 operate to cause sliding in the large friction mechanism 13, but no sliding occurs in the small friction mechanism 15 when the output rotary member 3 twists with respect to the input rotary member 2 through a range between the states shown in FIGS. 28 and 29. Therefore, the characteristics of a high rigidity and a low hysteresis torque can be produced in the range of the negative second space angle θACp as shown in FIG. 34. This high rigidity is higher than the rigidity in the second stage, but is much smaller than the conventional rigidity in a corresponding second stage. Owing to the above characteristics, the minute torsional vibrations not exceeding a predetermined torque and therefore having a small torsion angle (amplitude) can be effectively absorbed and damped.

Since the negative second space angle θACn is much smaller than the positive second space angle θACp, the negative second space angle θACn can be reduced while keeping a sufficient magnitude of the positive second space angle θACp, whereby it is possible to reduce the peak of vibration at the resonance frequency during deceleration. The hysteresis torque HAC caused by minute vibrations is much smaller than the hysteresis torque H2 caused by the normal twisting operation in the second stage. Owing to the above structures, it is possible to absorb and damp effectively the minute torsional vibrations not exceeding the predetermined torque and having a small torsion angle (amplitude).

Figure 29:
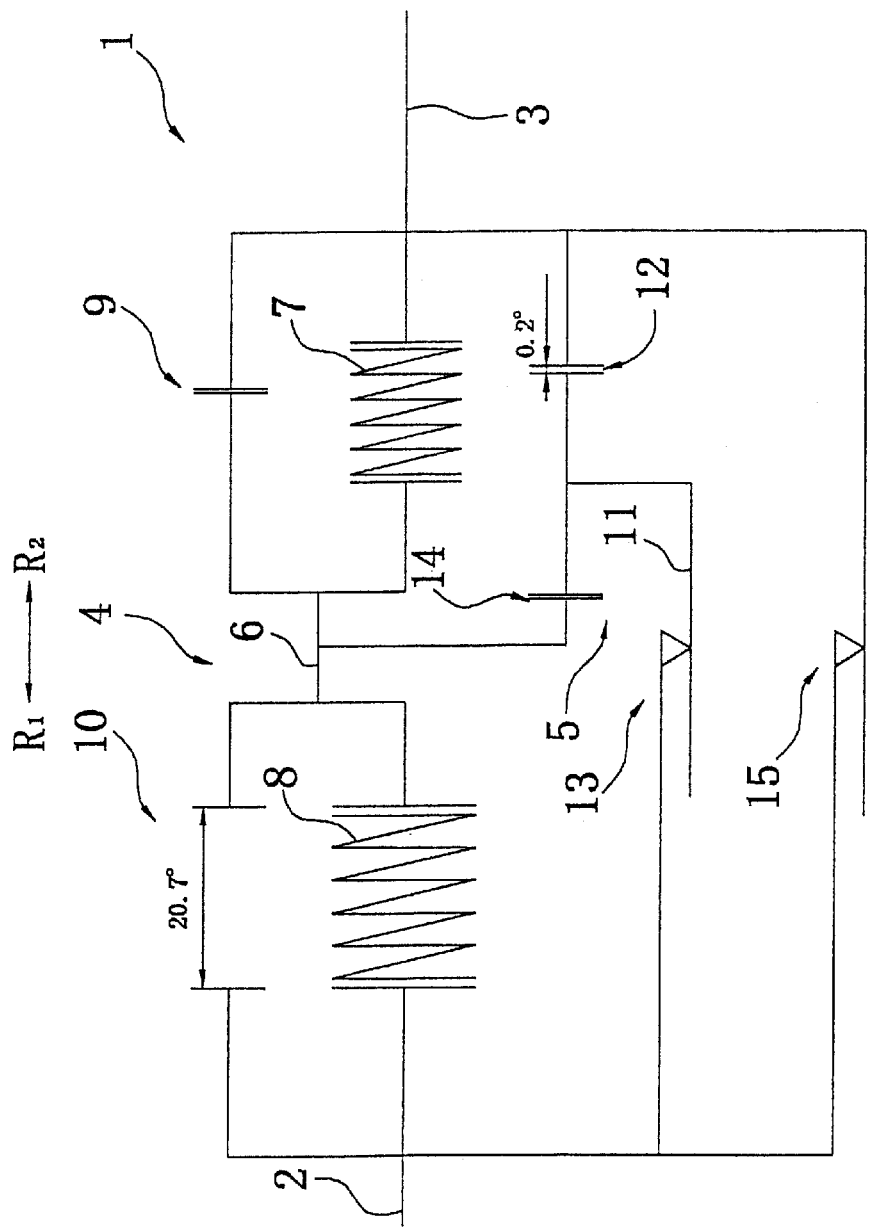
Figure 30:
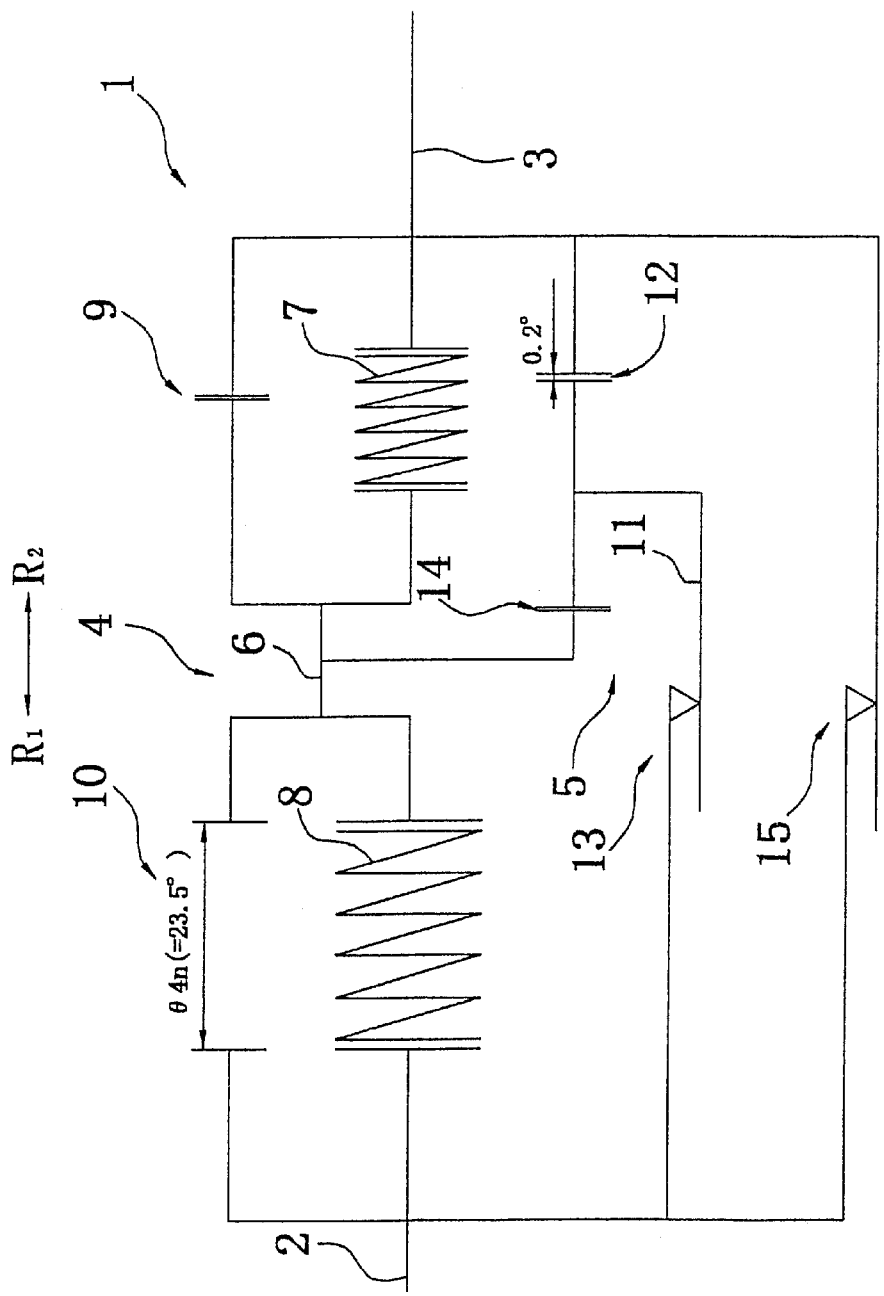
Figure 31:
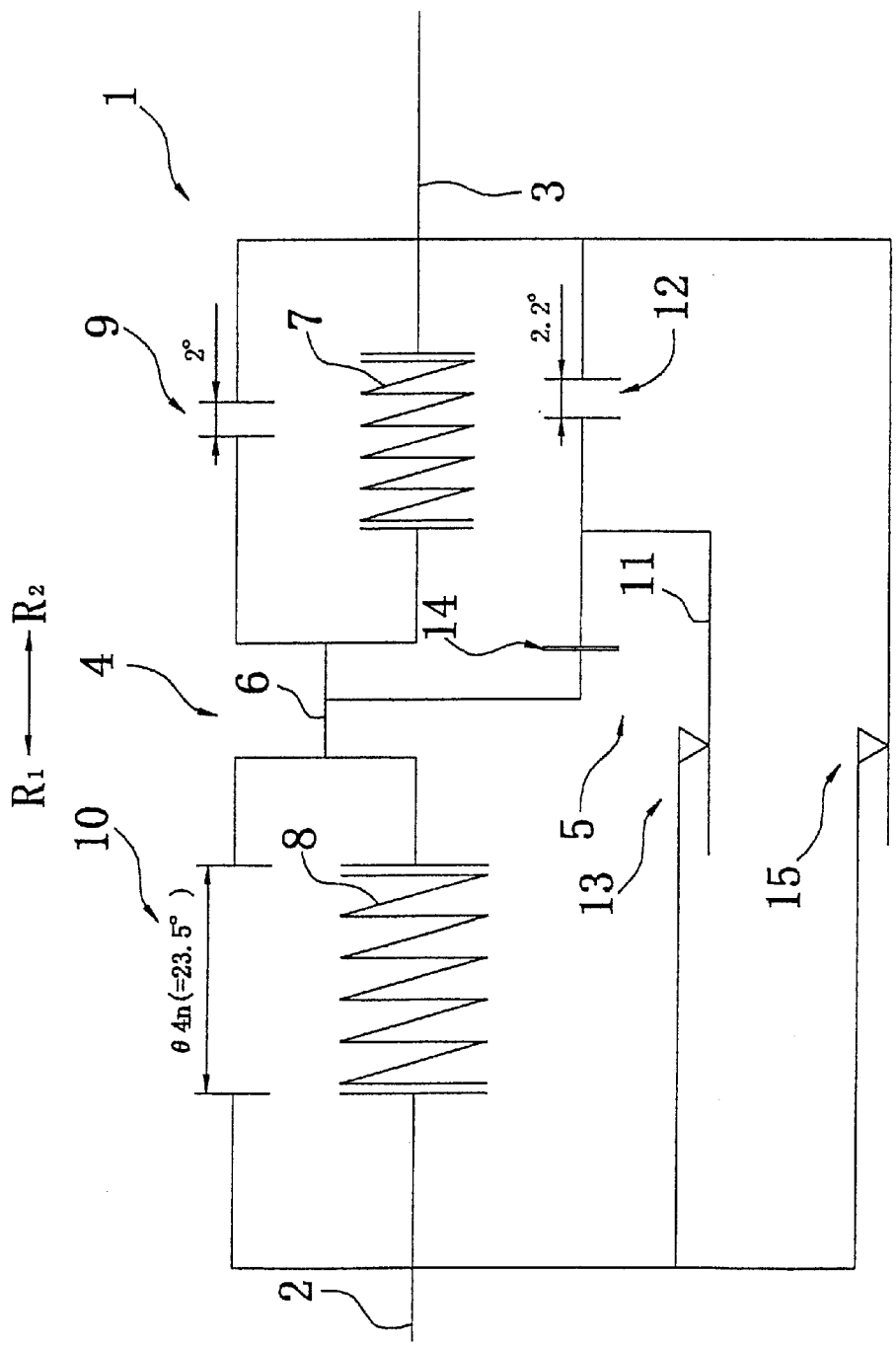

The second springs 8 in FIG. 29 expand, and enter the state shown in FIG. 30. In FIG. 30, the second springs 8 are in a free state, and will expand no further. When the first springs 7 in the state shown in FIG. 30 expand, they enter the state in FIG. 31. In this operation, the springs 7 push the output rotary member 3 toward the R2 side. FIG. 31 shows the state where the first springs 7 are in the free state, and thus shows the state of 0 degrees in the torsion characteristic diagram. From comparison between FIGS. 31 and 20, it can be seen that the intermediate plate 11 in FIG. 31 is in the position twisted by the third space angle θ3n (0.7 degrees) toward R1 side with respect to the other members. As a result, the space angle of (θ2n+θ3n=2.2 deg.) is kept in the third stop 12, and the intermediate plate 11 is in contact with the separated flange 6 in the fourth stop 14.

Figure 19:
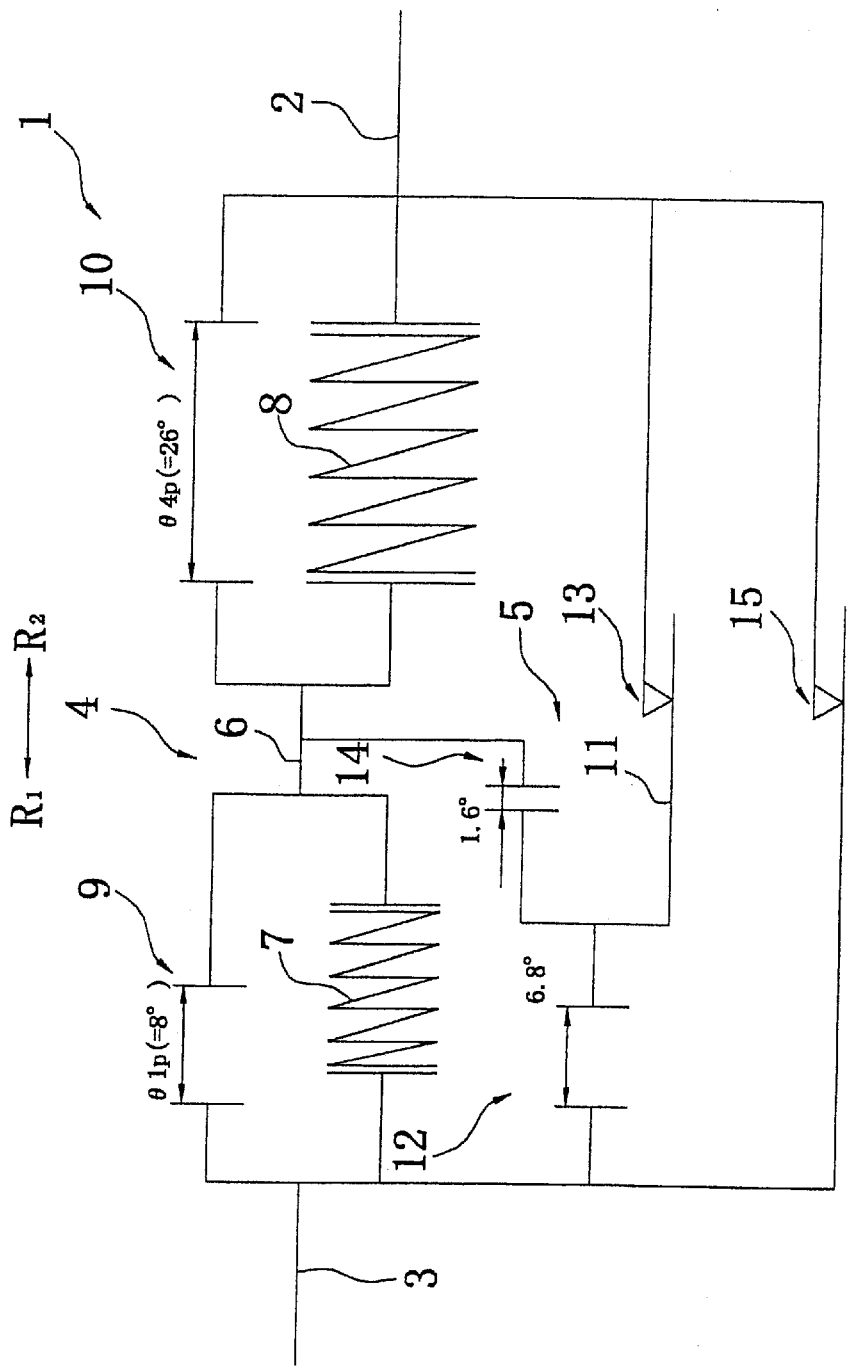

The state in FIG. 31 corresponds to the state in FIG. 19. In FIG. 31, the intermediate plate 11 is in the position twisted by the third space angle θ3n (0.7 deg.) toward the R1 side from the position at 0 degrees in the torsion characteristic diagram (FIG. 32). When the output rotary member 3 in FIG. 19 twists toward the R1 side with respect to the input rotary member 2, the region of the low rigidity and the high hysteresis torque starts at an angle preceding by θ3n, the start in the case of twisting from the neutral position owing to the structure described above.

Now, description is specifically given on changes in torsion characteristic which occur when various torsional vibrations are supplied to the clutch disk assembly 1.

When torsional vibrations of a large amplitude such as longitudinal vibrations of a vehicle occur, the torsion angle repetitively changes in and between the positive and negative second stages of the characteristics (the second stage corresponding to compression of the springs 8). In this operation, a high hysteresis torque occurs in the second stage so that longitudinal vibrations of the vehicle are rapidly damped.

Then, it is assumed that the clutch disk assembly 1 is supplied with minute torsional vibrations caused, e.g., by combustion variations in the engine during normal driving. In this state, the output and input rotary members 3 and 2 can rotate relatively to each other without operating the friction mechanism 13 in a range of the positive second space angle θACp. Thus, in the range of the space angle θACp shown in the torsion characteristic diagram, the second spring 8 operates, but slide does not occur in the friction mechanism 13. As a result, minute torsional vibrations, which may cause rattle and muffled noises during driving, can be effectively absorbed.

Figure 35:
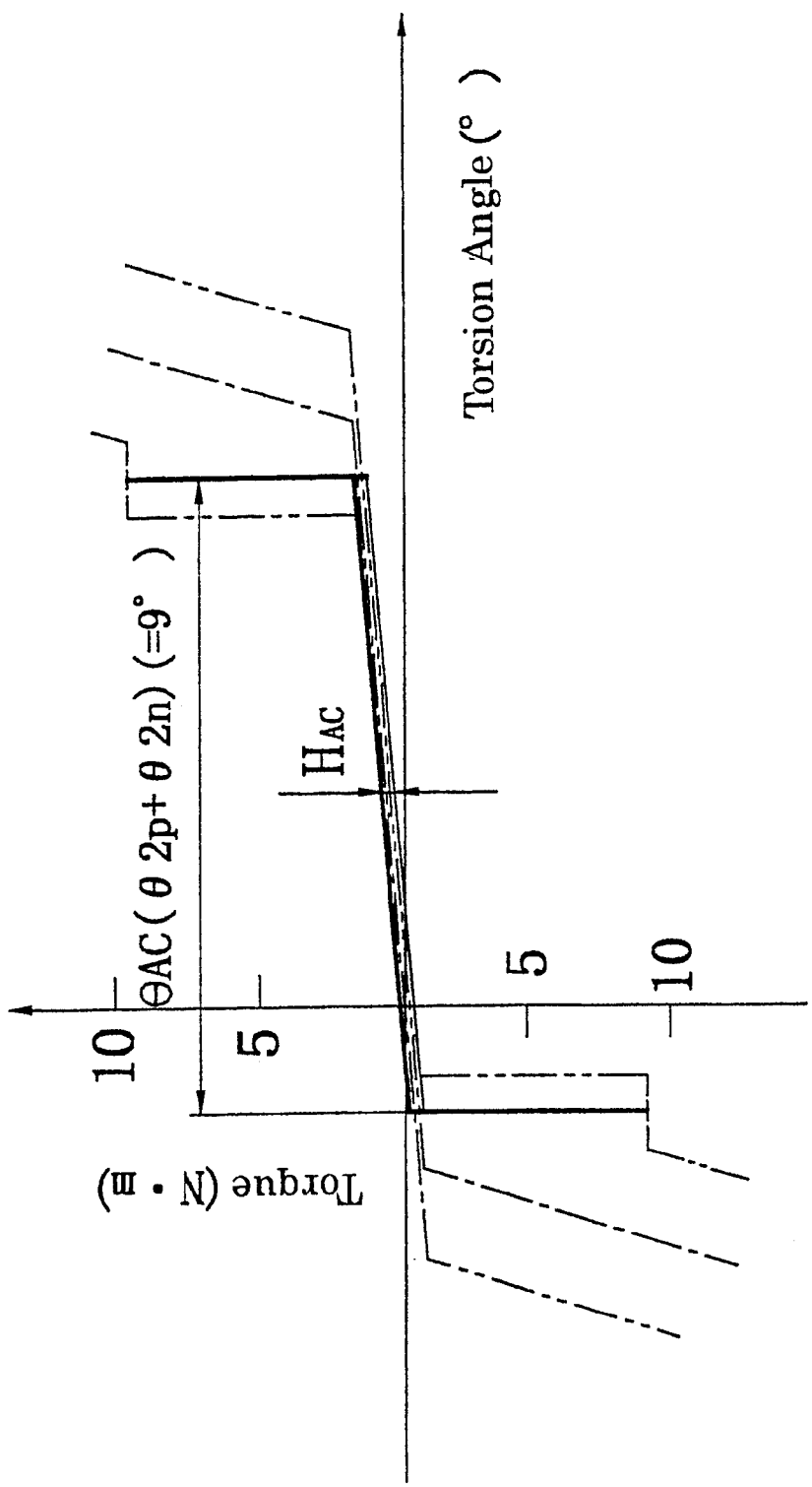
FIG. 35 is a graph of torque-displacement responses depicted in FIG. 32, on an enlarged scale, showing primarily the response in the first stage of operation of the damper mechanism.

Description is now given on the operation in the case where minute vibrations such as idling vibrations are supplied to the clutch disk assembly 1. In this case, the damper mechanism operates in the range of the second space angle θAC (θ2p+θ2n) as shown in FIG. 35. In this operation, the first springs 7 operate, and no slide occurs in the large friction mechanism 13. The above low rigidity and low hysteresis torque achieved in the second stage range improve the standing gear noise level. Although the low rigidity and low hysteresis torque thus achieved in the second stage range may cause a jumping phenomenon, the jumping phenomenon is suppressed in the clutch disk assembly 1 by provision of the regions of a low rigidity and a high hysteresis torque on the opposite sides of the second stage range. The above mentioned jumping phenomenon is a phenomenon, in which vibrations rebound from walls of both the positive and negative second stages and develop into vibrations (oscillations) over the entire second stage range so that high level noises may occur.

The damper mechanism according to the invention can be employed in a structure other than the clutch disk assembly. For example, the damper mechanism according to the invention can be applied, for example, to a damper mechanism including two flywheels which are elastically coupled together in the rotating direction.

According to the damper mechanism of the invention, the first angle range, where the friction suppressing mechanism stops the operation of the friction mechanism in the positive second stage, is different in magnitude from the second angle range, where the friction suppressing mechanism stops the operation of the friction mechanism in the negative second stage. Therefore, the angle of an appropriate magnitude can be ensured for the low hysteresis torque in each of the above regions.

Further, in the damper mechanism described above in accordance with the present invention, the first and second circumferential spaces corresponding to the angles (θ2p+θ2n) are independent of each other and different dimensions from one another. Therefore, it is easy to provide the first and second circumferential spaces of different magnitudes, respectively. Consequently, the first and second circumferential spaces can be defined by appropriate angles in the second stage, respectively.

What is claimed is:

1. A damper mechanism comprising:

an input rotary member;

an output rotary member for limited relative rotary displacement therebetween such that torque is transmitted therebetween;

a damper including a spring member arranged to connect elastically said input rotary member and said output rotary member in a rotating direction, said damper mechanism being arranged to exhibit torsion characteristics in a positive side where said input rotary member is twisted relative to said output member in the input rotational direction and a negative side where said input rotary member is twisted relative to said output member in the opposite of said input rotational direction;

a friction mechanism arranged to generate friction when said input rotary member and said output rotary member rotative relative to each other and a spring force of said spring member is applied thereto; and a friction suppressing mechanism operatively arranged to form a rotational gap that closes in a non-continuous manner during continuous compression of said damper, said rotational gap arranged to prevent said spring force of said spring member from being applied to said friction mechanism, said rotational gap existing only in one of said positive and negative sides of said torsional characteristics.

2. The damper mechanism according to claim 1, wherein said rotational gap exists only in said negative side of said torsional characteristics.

3. A damper mechanism comprising:

an input rotary member;

an output rotary member for limited relative rotary displacement therebetween such that torque is transmitted therebetween;

a damper including spring members arranged to connect elastically said input rotary member and said output rotary member in a rotating direction, said damper mechanism arranged to exhibit torsion characteristics in at least a first stage and a second stage, said second stage having a torsional angle wider than said first stage and a higher rigidity than said first stage, said second stage including a positive side where said input rotary member is twisted relative to said output member in the input rotational direction and a negative side where said input rotary member is twisted relative to said output member in direction opposite of said input rotational direction;

a friction mechanism arranged to generate friction when said input rotary member and said output rotary member rotate relative to each other, a spring force of at least one of said spring members being applied thereto; and a friction suppressing mechanism arranged to have a rotational gap to prevent said spring force of at least one of said spring members to be applied to said friction mechanism in said second stage, said rotational gap existing only in one of said positive and negative sides of said second stage of said torsional characteristics.

4. The damper mechanism according to claim 3, wherein said rotational gap exists only in said negative side of said torsional characteristics.

5. A damper mechanism comprising:

an input rotary member;

an output rotary member for limited relative rotary displacement therebetween such that torque is transmited therebetween;

a damper including spring members arranged to connect elastically said input rotary member and said output rotary member in a rotating direction, said damper mechanism being arranged to exhibit torsion characteristics on a positive side where said input rotary member is twisted relative to said output member in the input rotational direction and a negative side where said where said input rotary member is twisted relative to said output member in a direction opposite of said input rotational direction;

a friction mechanism arranged to generate friction when said input rotary member and said output rotary member rotate relative to each other and a spring force of at least one of said spring members is applied thereto; and a friction suppressing mechanism arranged to maintain independent rotational gaps arranged to close in a non-continuous manner during continuous compression said damper, said rotational gap arranged to prevent said spring force of at least one of said spring members to be applied to said friction mechanism in said positive side and said negative side of said torsional characteristics, thereby ensuring said rotational gaps in said positive side and negative side of said torsional characteristics have different sizes.

6. The damper mechanism according to claim 5, wherein one of said rotational gaps in said positive side of said torsional characteristics is 0 degree.

7. The damper mechanism according to claim 6, wherein said rotational gaps in said negative side of said torsional characteristics is 0 degree.

8. A damper mechanism comprising:

an input rotary member;

an output rotary member for limited relative rotary displacement therebetween such that torque is transmitted therebetween;

a damper including spring members arranged to connect elastically said input rotary member and said output rotary member in a rotating direction, said damper mechanism arranged to exhibit torsion characteristics in at least a first stage and a second stage, said second stage having a torsional angle wider than said first stage and a higher rigidity than said first stage, said second stage including a positive side where said input rotary member is twisted relative to said output member in the input rotational direction and a negative side where said where said input rotary member is twisted relative to said output member in a direction opposite of said input rotational direction;

a friction mechanism arranged to generate friction when said input rotary member and said output rotary member rotate relative to each other and a spring force of at least one of said spring members is applied thereto; and a friction suppressing mechanism arranged to maintain independent rotational gaps in said second stage for preventing said spring force of at least one of said spring members from being applied to said friction mechanism in said positive side and said negative side of said second stage of said torsional characteristics, thereby ensuring said rotational gaps in said positive side and negative side of said second stage of said torsional characteristics have different sizes.

9. The damper mechanism according to claim 8, wherein one of said rotational gaps in said positive side and said negative side of said second stage of said torsional characteristics is 0 degree.

10. The damper mechanism according to claim 9, wherein said rotational gaps in said negative side of said second stage of said torsional characteristics is 0 degree.

* * * * *